United States Patent
Suzuki et al.

(10) Patent No.: US 7,549,555 B2
(45) Date of Patent: Jun. 23, 2009

(54) PRESSURE CONTAINER

(75) Inventors: Tetsuya Suzuki, Aichi (JP); Minoru Komada, Aichi (JP); Kazuo Fujihara, Aichi (JP); Yoshiaki Kondo, Aichi (JP); Takashi Maeno, Aichi (JP); Isamu Komatsu, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 499 days.

(21) Appl. No.: 10/744,070

(22) Filed: Dec. 24, 2003

(65) Prior Publication Data

US 2004/0173618 A1    Sep. 9, 2004

(30) Foreign Application Priority Data

| Dec. 27, 2002 | (JP) | ............................ P2002-381195 |
| Jan. 29, 2003 | (JP) | ............................ P2003-020412 |
| Mar. 28, 2003 | (JP) | ............................ P2003-092448 |

(51) Int. Cl.
*F17C 1/00* (2006.01)
*B65D 6/00* (2006.01)
*B65D 1/42* (2006.01)

(52) U.S. Cl. ..................... 220/581; 220/669; 220/646
(58) Field of Classification Search ................. 220/581, 220/592, 601, 640, 654, 669, 646
See application file for complete search history.

(56) References Cited

U.S. PATENT DOCUMENTS

| 3,319,658 | A | | 5/1967 | Mercier |
| 3,508,677 | A | * | 4/1970 | Laibson et al. ............. 220/590 |
| 4,699,288 | A | | 10/1987 | Mohan |
| 5,287,988 | A | | 2/1994 | Murray |
| 5,518,141 | A | * | 5/1996 | Newhouse et al. .......... 220/586 |
| 5,979,692 | A | | 11/1999 | West |

(Continued)

FOREIGN PATENT DOCUMENTS

JP      EP 0 550 951 A1    7/1993

(Continued)

OTHER PUBLICATIONS

Office Action dated Feb. 27, 2008 in corresponding Japanese Patent Application No. 2002-381195 (and English translation).

(Continued)

*Primary Examiner*—Anthony D Stashick
*Assistant Examiner*—Shawn M Braden
(74) *Attorney, Agent, or Firm*—Posz Law Group, PLC

(57) ABSTRACT

A flange is provided at the opening metal of a pressure container, and it extends toward the periphery of the container body at the bonding part thereof at which it bonds to the container body. The liner of the pressure container has a self-sealing part at which it abuts the flange to be sealed up together. On the outer peripheral side of the self-sealing part, a ring-shaped constraint member is provided in the outer periphery of the liner, and the constraint member is to restrict the diameter expansion of the liner to be caused by the expansion of the container body. The liner has an easily-displaceable part that is readily elongable and deformable, at the outer periphery thereof in the radial direction of the self-sealing part.

8 Claims, 12 Drawing Sheets

U.S. PATENT DOCUMENTS

| | | | |
|---|---|---|---|
| 6,190,481 | B1 | 2/2001 | Iida et al. |
| 6,227,402 | B1 | 5/2001 | Shimojima et al. |
| 2004/0028874 | A1* | 2/2004 | Takemoto et al. ............ 428/98 |

FOREIGN PATENT DOCUMENTS

| | | |
|---|---|---|
| JP | A-06-137433 | 5/1994 |
| JP | A-08-1813 | 1/1996 |
| JP | A-08-035598 | 2/1996 |
| JP | A-08-219392 | 8/1996 |
| JP | 09032642 A * | 2/1997 |
| JP | A-09-096399 | 4/1997 |
| JP | EP 0 857 911 A1 | 8/1998 |
| JP | A-11-123768 | 5/1999 |

OTHER PUBLICATIONS

Office Action from German Patent Office issued on Mar. 23, 2006 for the corresponding German patent application No. 10360953.9-12 (a copy and English translation thereof).

* cited by examiner

PRESSURE CONTAINER

The present application is based on Japanese Patent Applications Nos. 2002-381195, 2003-20412 and 2003-92448, the entire contents of which are incorporated herein by reference.

BACKGROUND OF THE INVENTION

1. Field of the Invention

The present invention relates to pressure containers that are filled with various compressed gases such as CNG (compressed natural gas), various liquefied gases such as LNG (liquefied natural gas), LPG (liquefied petroleum gas), high-pressure hydrogen gases and other various pressurized substances.

2. Related Art

For pressure containers that are filled with various pressurized substances such as various compressed gases and various liquefied gases, generally employed are those that comprise a hollow resinous liner and a metallic opening metal fitted thereto. For ensuring the pressure resistance of pressure containers, in general, the outer peripheries of the liner and the opening metal are coated with a reinforcing member that satisfies predetermined pressure resistance standards.

In this case, in general, the metallic opening metal is worked to have a flange that extends toward the periphery of the container body at the bonding part thereof at which it bonds to the container body, and a part of the liner that abuts the flange is worked to have a self-sealing part that abuts the flange to be sealed up together, for ensuring the air tightness inside the pressure containers. Recently, some developments have been made for further ensuring the bonding of the self-sealing part to the flange in such pressure containers (e.g., U.S. Pat. No. 5,979,692).

FIG. 1 is a partly-enlarged, schematic cross-sectional view that shows the liner and the opening metal of the conventional pressure container illustrated in U.S. Pat. No. 5,979,692. The container 101 is so constructed that its flange 102 has a groove 103 that extends toward the direction of the wall thickness and a part of the self-sealing part 105 gets into the groove 103. Thus constructed, the self-sealing part 105 well bonds to the flange 102, and the opening metal 106 and the liner 107 are therefore well sealed up together at their bonding part to ensure the air tightness in the inside area 108 of the pressure container. In addition, the anchor part 110 that gets into the groove 103 of the self-sealing part 105 serves as an anchor of the self-sealing part 105. Therefore, when the container body 111 is filled with a pressurized substance and even when it is thereby expanded, the bonding between the self-sealing part 105 and the flange 102 is still kept as such owing to the anchor effect of the anchor part 110, and the seal ability of the self-sealing part 105 is therefore ensured.

Even in such pressure containers, however, the stress concentration in the resinous liner is great and the liner may be thereby broken or damaged. Anyhow, the seal ability of the pressure containers is not always satisfactory, and it is desired to develop pressure containers of improved seal ability and increased reliability.

Further, as for materials, Iron materials or steels have heretofore been used for the gas containers filling various gases therein. However, since iron has a large specific gravity, 7.9, gas containers formed of iron are problematic in that their weight is large. For example, when such gas containers are filled with fuel gas and mounted on vehicles, it is problematic in that the fuel expenses for vehicles increase. Not limited to such cases, in addition, when the container weight increases, then it causes various problems in that the containers are difficult to handle and the container shapes are limited since the mold ability of iron material is not good. Therefore, gas containers formed of other materials such as aluminium or resin are developed these days.

Of those, resin is expected to be a material capable of realizing gas containers that are lightweight and are given a lot of latitude in their shape, since its impact resistance is good, it is lightweight and its mold ability is good. When a resin material is used in forming gas containers, it must have a gas-barrier property of shielding gas penetration through it. When such a resin material is selected and used in forming gas containers, then the gas containers formed generally have a multi-layered structure that comprises a gas-barrier layer as the inner layer of the hollow gas container body and an FRP layer as the outer layer for ensuring the pressure resistance of the body. This is for preventing the resin material to form the gas containers from being fatigued owing to repeated expansion and contraction of the containers that are subjected to repeated filling and discharging of compressed gas in and out of them (e.g., Japanese Patent Publications Nos. JP-A 8-1813, JP-A 8-219392).

The gas containers described in JP-A 8-1813, JP-A 8-219392 comprise a gas-barrier layer formed of a resin material such as polyethylene resin, polypropylene resin, polyamide resin, ABS resin, polybutylene terephthalate resin, polyacetal resin or polycarbonate resin, and an FRP layer formed by winding up melt resin-infiltrated carbon fibers or glass fibers around it as the outer layer thereof. The resin materials mentioned above have a good gas-barrier property against gases having a large molecular weight, and therefore can be used, for example, for gas containers to be filled with CNG (compressed natural gas).

The above-mentioned various resin materials have a good gas-barrier property against gases having a large molecular weight, but could not exhibit their gas-barrier property against gases having a small molecular weight such as hydrogen gas. Accordingly, in order that the containers can be filled with gases having a small molecular weight, an additional gas-barrier layer of a resin material except the above-mentioned ones must be formed.

On the other hand, ethylene-vinyl alcohol copolymer resin (EVOH) is used as a resin material to form a gas-barrier layer (e.g., Japanese Patent Publication No. JP-A 11-123768). Since EVOH exhibits a good gas-barrier property even against gases having a small molecular weight, it is favorable for the gas-barrier layer against hydrogen gas, etc. On the other hand, however, its low-temperature impact resistance is poor, and the resin is therefore problematic in that it could not have satisfactory mechanical strength at low temperatures, for example, at $-30°$ C. or lower.

In addition, the conventional gas containers as in JP-A 8-1813, JP-A 8-219392 and JP-A 11-123768 are resistant to pressure of 35 MPa or so. However, depending on their service condition, it is often desired that the pressure resistance of gas containers is further increased and gases of higher pressure are filled into them. Specifically, if gases of higher pressure could be filled in containers, then the frequency of exchanging gas containers and the frequency of gas charging into containers could be reduced. This saves users' labor and enables long-term use of gas-charged containers. However, the pressure resistance of the gas containers formed of conventional resin materials is unsatisfactory when they are filled with high-pressure gases. Given that situation, it is desired to develop resinous gas containers that have further increased pressure resistance.

SUMMARY OF THE INVENTION

The present invention has been made in consideration of the above situation, and it is to provide a pressure container of improved seal ability in which the bonding between the self-sealing part and the flange is kept good.

The present invention is to provide a resinous container for high-pressure gas of which the advantages are that it is lightweight and has a lot of latitude in its shape, it exhibits a satisfactory and good gas-barrier property even against gases having a low molecular weight such as hydrogen gas, and it has good low-temperature impact resistance.

The pressure container of the invention that solves the above problems comprises a hollow container body of which the inner surface is coated with a resinous liner, and an opening metal which forms the circumferential edge of the opening that opens into a part of the container body and of which one end protrudes outside the container body, wherein the opening metal has a flange that extends toward the periphery of the container body at the bonding part thereof at which it bonds to the container body, the liner has a self-sealing part at which it abuts the flange to be sealed up together, and on the outer peripheral side of the self-sealing part, a ring-shaped constraint member is provided in the outer periphery of the liner, and the constraint member is to restrict the diameter expansion of the liner to be caused by the expansion of the container body.

Thus constructed, the pressure container is provided with the constraint member in the outer periphery of the liner on the outer peripheral side of the self-sealing part thereof, and the constraint member is to restrict the diameter expansion of the liner. Accordingly, when the pressure container is filled with a pressurized substance and even when it is thereby expanded, the constraint member acts to restrict the diameter expansion of the liner. As a result, the diameter of the liner is prevented from expanding and the self-sealing part is therefore prevented from being pulled toward the outer periphery thereof, and accordingly, the bonding between the liner and the flange is kept good and the liner seal ability is therefore kept good.

The liner may be so worked that it has an easily-displaceable part that is readily elongable and deformable, at the outer periphery thereof in the radial direction of the self-sealing part.

The pressure container of the invention has a hollow container body of which the inner surface is coated with a resinous liner.

Since the inner surface of the container body is coated with a resinous liner, the pressurized substance filled in the pressure container is prevented from leaking out of the pressure container. The container body may be formed of a liner alone, or the outer surface of the liner thereof may be coated with a constraint layer. For the liner, any ordinary material may be suitably selected. For example, it may be formed of polyethylene or the like of which the CNG gas transmittance is low. The constraint layer may also be formed of any ordinary material. For example, reinforcing fibers such as carbon fibers, glass fibers or aramid fibers are dipped in a resin such as epoxy resin, and the resulting resin is thermally cured to give FRP, and it may be used in forming the constraint layer.

A part of the container body has an opening that communicates with the hollow inside and opens outside the container body. Through this opening, a pressurized substance is filled in and taken out of the container. The circumferential edge of the opening is formed of an opening metal, and one end of the opening metal that forms the circumferential edge of the opening protrudes outside the container body. The opening metal is formed of a material of which the pressurized substance transmittance is low and which is rigid enough to keep the shape of the opening thereof. For example, it may be formed of a metal material.

The opening metal has a flange that extends toward the periphery of the container body at the bonding part thereof at which it bonds to the container body. The flange is to form a site at which it abuts the self-sealing part of the liner that will be mentioned herein under, and its shape extends toward the periphery of the container body to thereby ensure the bonding area in which it bonds to the self-sealing part.

The liner has a self-sealing part at which it abuts the flange to be sealed up together. The self-sealing part of the liner is positioned on the side of the opening of the container body, and it abuts the flange that forms the circumferential edge of the opening. The self-sealing part abuts the flange and the bonding area between the liner and the flange is thereby sealed up to ensure the air tightness inside the container body.

On the outer peripheral side of the self-sealing part, a ring-shaped constraint member is provided in the outer periphery of the liner, and the constraint member is to restrict the diameter expansion of the liner to be caused by the expansion of the container body. The constraint member may be formed of a highly rigid material that deforms little through expansion. For example, it may be formed of the same material as that for the constraint layer. The constraint member is provided on the outer peripheral side of the self-sealing part. Therefore, when the pressure container is filled with a pressurized substance and even when the container body is thereby expanded, the diameter expansion of the liner that is positioned inside the constraint member is restricted. When the diameter expansion of the liner is thus restricted, then pulling the self-sealing part by the liner may be prevented or reduced, and the sealing at the self-sealing part is kept good. In addition, since the constraint member is provided at the outer periphery of the liner, it may favorably restrict the diameter expansion of the liner to the effect as above while the condition of the inner surface of the container body coated with the liner is kept good.

So far as it is provided on the outer peripheral side of the self-sealing part and in at least a part of the outer periphery of the liner, the constraint member maybe a different member from the liner, or may be embedded in the linter to be integrated with it. In case where a constraint layer is provided in the container body, the constraint member may be different from the constraint layer or may be integrated with it.

In the pressure container of the invention, the liner may be so constructed as to have an easily-displaceable part that is readily elongable and deformable, at the outer periphery thereof in the radial direction of the self-sealing part.

The easily-displaceable part may be any one that is formed to be readily elongable and deformable. Even when the liner diameter has expanded a little, the easily-displaceable part thus formed in the manner as above is first pulled by the liner and is thereby elongated and deformed, and therefore the tension by the diameter expansion can be absorbed by the easily-displaceable part. Accordingly, the tension transmission to the self-sealing part that is further inside the easily-displaceable part in the radial direction is inhibited and the bonding between the self-sealing part and the flange is therefore kept good. In addition, since the constraint member is disposed on the outer peripheral side of the self-sealing part, the tension transmission from the easily-displaceable part to the self-sealing part is further inhibited by the constraint member.

As so mentioned hereinabove, since the diameter expansion of the liner that is positioned on the inner peripheral side of the constraint member is restricted by the constraint member, the elongation and deformation of the easily-displaceable part occurs more greatly on the outer peripheral side than on the inner peripheral side of the constraint member. Accordingly, in order to further enlarge the degree of elongation and deformation of the easily-displaceable part, it is effective to increase the elongable and deformable length of the easily-displaceable part disposed on the outer peripheral side of the constraint member rather than that on the inner peripheral side thereof. For example, when the easily-displaceable part is so formed that it is disposed in a position different from that of the self-sealing part in the axial direction of the container body and it extends almost in parallel to the self-sealing part in that direction, then the length of the easily-displaceable part may be increased in the axial direction and the elongable and deformable length of the easily-displaceable part may be thereby increased. On the other hand, when the easily-displaceable part is bellows-wise formed in the radial direction, then the elongable and deformable length of the easily-displaceable part may also be increased. In addition, for further enlarging the degree of elongation and deformation of the easily-displaceable part, for example, the easily-displaceable part may be thinned and formed of the same material as that of the liner so that it may be more readily elongable and deformable, or the easily-displaceable part may be formed of a material that is more elongable and deformable than that of the liner and it may be integrated with the liner.

The container for high-pressure gas of the invention that solves the above problems comprises a resinous hollowed container body that is open at its one end and is filled with high-pressure gas in its hollow, and a constraint layer formed as the outer layer of the container body to restrict the expansion of the container body, wherein the container body has a multi-layered structure that includes a gas-barrier layer formed of EVOH for shielding the penetration of the high-pressure gas filled in the hollow toward the outside of the hollow, and a cover resin layer formed as the inner layer and/or the outer layer of the gas-barrier layer for ensuring the low-temperature impact resistance of the container body.

The container body may be completed by bonding plural split bodies that are separately formed, and the bonding part of the split bodies may be formed of the gas barrier layer or the cover resin layer alone.

The bonding part may be formed of the cover resin layer alone, a second gas-barrier layer may be laminated at least on the bonding part as the outer layer of the part, and the constraint layer may be formed as the outer layer of the container body and the second gas-barrier layer.

The bonding part may be formed of the gas-barrier layer alone, a second cover resin layer may be laminated at least on the bonding part as the outer layer of the part, and the constraint layer may be formed as the outer layer of the container body and the second cover resin layer.

The outer layer of the container body may be provided with a ring-shaped constraint member that restricts the expansion of the container body.

The method for producing a container for high-pressure gas of the invention that solves the above problems is for producing a container for high-pressure gas that comprises a resinous hollowed container body which is open at its one end and is filled with high-pressure gas in its hollow, and a constraint layer formed as the outer layer of the container body to restrict the expansion of the container body, and the method comprises a split body-forming step of forming a split part of a container body, which has a multi-layered structure that includes a gas-barrier layer formed of EVOH for shielding the penetration of the high-pressure gas filled in the hollow toward the outside of the hollow, and a cover resin layer formed as the inner layer and/or the outer layer of the gas-barrier layer for ensuring the low-temperature impact resistance of the container body, and of which the end is formed of the gas-barrier layer or the cover resin layer alone, a welding step of welding the split bodies with their ends facing each other to construct the container body, and a constraint layer-forming step of forming a constraint layer as the outer layer of the container body.

In the method for producing a container for high-pressure gas of the invention, the end of the split body may be formed of the cover resin layer alone in the split body-forming step, and the welding step may be followed by a gas-barrier lamination step of laminating a second gas-barrier layer at least on the bonding part at which the ends of the split bodies bond to each other, as the outer layer of the part.

In the method for producing a container for high-pressure gas of the invention, the end of the split body may be formed of the gas-barrier layer alone in the split body-forming step, and the welding step may be followed by a cover resin lamination step of laminating a second cover resin layer at least on the bonding part at which the ends of the split bodies bond to each other, as the outer layer of the part.

In the method for producing a container for high-pressure gas of the invention, the welding step may be further followed by a constraint member-forming step of forming a ring-shaped constraint member in the outer layer of the container body.

In the container for high-pressure gas of the invention, the gas-barrier layer is formed of a material of EVOH. Therefore, the container can exhibit a satisfactory and good gas-barrier properties even against gases having a low molecular weight. In this, in addition, since a cover resin layer is formed as the inner layer and/or the outer layer of the gas-barrier layer formed of EVOH, the container body ensures low-temperature impact resistance even at low temperatures, for example, at −30° C. or lower.

In addition, since the constraint layer is formed as the outer layer of the container body, it restricts the expansion of the container body and therefore improves the pressure resistance of the container.

Of the container for high-pressure gas of the invention, the container body is hollowed and is open at its one end, and it is filled with high-pressure gas in its hollow. The container for high-pressure gas of the invention can be used as a gas container for filling and discharging high-molecular-weight gases such as CNG and low-molecular-weight gases such as hydrogen gas, and, for example, it is used for gas cylinders and gas tanks for fuel gas.

Of the container for high-pressure gas of the invention, the container body has a multi-layered structure that includes a gas-barrier layer and a cover resin layer. The gas-barrier layer is formed of a material of EVOH, and this is to shield the penetration of the high-pressure gas filled in the hollow of the container body toward the outside of the hollow. In the container for high-pressure gas of the invention, the gas-barrier layer is formed of a material of EVO. Therefore, the container exhibits its gas-barrier property not only a against high-molecular-weight gases but also even against low-molecular-weight gases, and it enables full shielding of penetration of various gases through it.

The cover resin layer is formed as the inner layer and/or the outer layer of the gas-barrier layer, and this is for ensuring the low-temperature impact resistance of the container body. The cover resin layer may be formed of any known resin material of good low-temperature impact resistance, such as polyethylene resin, polyamide, adhesive polyolefin, etc. Of those, polyethylene and the like having good compatibility with EVOH are more preferred for the cover resin layer, since the gas-barrier layer and the cover resin layer may be readily formed at the same time, for example, in a sandwich molding or twin-cylinder molding process. in the container for high-pressure gas of the invention, the cover resin layer may be formed as the inner layer of the gas-barrier layer or as the outer layer thereof. It may also be formed as both the inner layer and the outer layer of the gas-barrier layer. In any case, the low-temperature impact resistance of the gas-barrier layer may be ensured by the cover resin layer. In the container for high-pressure gas of the invention, the cover resin layer may be formed as both the inner layer and the outer layer of the gas-barrier layer, or the cover resin layer may be formed thick, whereby the low-temperature impact resistance of the container body may be further improved in accordance with the use of the container.

In the container for high-pressure gas of the invention, the container body has a multi-layered structure that includes the gas-barrier layer and the cover resin layer. Accordingly, the container realizes both the gas-barrier property against low-molecular-weight gases and the low-temperature impact resistance.

The container body may be integrally formed at a time, or alternatively, plural split parts are separately formed and then they are bonded and integrated into one body in a known manner. In case where plural split parts are bonded and integrated into one container body, it is desirable that the bonding part of the split parts is formed of the gas-barrier layer or the cover resin layer alone. In this case, since the bonding part is formed of one layer, its peeling may be prevented. In addition, since the bonding part is formed of the same material alone, the bonding may be strong especially when it is effected through welding. Accordingly, the toughness of the container body further increases.

Even when the bonding part is formed of the cover resin layer alone, the gas-barrier property of the container is kept still good owing to the gas-barrier layer that exists in the multi-layered structure of the container. However, since the bonding part does not have the gas-barrier layer, the high-pressure gas filled in the container body may leak out of the body and the leakage may lower the gas-barrier property of the container itself. In that case, therefore, it is desirable that a second gas-barrier layer is additionally laminated as the outer layer of the bonding part. When such a second gas-barrier layer is laminated on the bonding part formed of the cover resin layer alone, as the outer layer of the part., then the second gas-barrier layer well prevents the leakage of high-pressure gas through the bonding part, and the container ensures its good gas-barrier properties. Also in this case, the constraint layer may be formed as the outer layer of the container body and the second gas-barrier layer.

In case where the bonding part is formed of the gas-barrier layer alone, the gas-barrier property of the container is good. However, it is more desirable that the bonding part of the gas-barrier layer alone is additionally laminated with a second cover resin layer as the outer layer thereof. The second cover resin layer thus formed on the bonding part of the gas-barrier layer alone as the outer layer thereof improves the low-temperature impact resistance of the bonding part. Also this case, the constraint layer may be formed as the outer layer of the container body and the second cover resin layer as in the above, The second gas-barrier layer and the second cover resin layer may be laminated only on the bonding part of the container body as the outer layer thereof, or may be laminated on any other part of the container body, The range in which the additional layer is laminated may be suitably determined with the easiness in container production and the gas-barrier property and the low-temperature impact resistance of the containers to be produced taken into consideration.

The resin material to form the second gas-barrier layer may be suitably selected from those mentioned hereinabove for the gas-barrier layer. The resin material to form the second cover resin layer may also be suitably selected from those mentioned hereinabove for the cover resin layer. The gas-barrier layer and the second gas-barrier layer may be or may not be formed of the same material; and the cover resin layer and the second cover resin layer may be or may not be formed of the same material.

In the container for high-pressure gas of the invention, a constraint layer is formed as the outer layer of the container body, and it restricts the expansion of the container body. The constraint layer may be formed of any material capable of restricting the expansion of the container body, and, for example, it may be formed of any known material such as FRP. In this case, the constraint layer restricts the expansion of the container body and therefore improves the pressure resistance of the container.

The outer layer of the container body may be so worked as to have there in a ring-shaped constraint member that restricts the expansion of the container body.

The ring-shaped constraint member thus formed in the outer layer of the container body in addition to the above-mentioned constraint layer further acts to restrict the expansion of the container body, and therefore further improves the pressure resistance of the container.

Like the constraint layer mentioned above, the constraint member may be formed of a material capable of restricting the expansion of the container body, and, for example, it may be formed of a known material such as FRP. The constraint member may exist anywhere in the outer layer of the container body but is preferably formed in the outer periphery of the opening of the container body through which the inside hollow of the container body communicates with the outside. In this case, the expansion of the container body that is inside the ring-shaped constraint member at the opening, or that is, the expansion of the gas-barrier layer and the cover resin layer of the container body is surely restricted by the constraint member. Accordingly, even when the container is filled with high-pressure gas, its opening is prevented from expanding to cause diameter expansion of the container body thereof, and, for example, when the circumferential edge of the opening is provided with a metallic opening metal, then the bonding of the gas-barrier layer and the cover resin layer to the opening metal is kept better. Accordingly, even when the container is filled with high-pressure container, its opening metal can be well sealed up with the gas-barrier layer and the cover resin layer.

The constraint member may be formed inside the constraint layer or outside it. Preferably, however, it is formed inside the constraint layer. The constraint member formed inside the constraint layer may be in direct contact with the container body, and it may restrict the expansion of the container body in a more favorable manner.

The method for producing a container for high-pressure container of the invention is for producing the above-mentioned container for high-pressure container of the invention.

The method comprises a split body-forming step, a welding step, and a constraint layer-forming step.

The split body-forming step is for forming a split part of a container body that has a multi-layered structure, in which the end of the split body is formed of a gas-barrier layer or a cover resin layer alone. As so mentioned hereinabove, when the end of the split body is formed of a gas-barrier layer or a cover resin layer alone, then the ends of the split bodies to be welded in the welding step that will be mentioned herein under are formed of the same material alone, and, as a result, the bonding part formed by welding the ends of the split bodies is firmly integrated into one. Accordingly, the toughness of the container body thus constructed is improved more. The end of the split body may be formed simultaneously with the multi-layered structure of the container body, or may be formed separately from it and may be integrated later. For simplifying the production process, however, it is desirable that the end and the multi-layered structure are simultaneously formed at the same time.

The multi-layered structure may be formed in various known methods. For it, for example, employable are various methods of insert molding, sandwich molding, two-color molding, twin-cylinder molding, film-in molding, film-transfer molding, multi-layer blow molding, multi-layer sheet forming, etc. Any of these methods are favorable as facilitating easy formation of the multi-layered structure that comprises a gas-barrier layer and a cover resin layer. Not limited to these, however, any of the gas-barrier layer or the cover resin layer may be formed in a known method, and then the other layer may be formed in known post-treatment such as dipping, spraying, slush spin molding, coating, sheet lining or the like. In any case, it is desirable that the thickness of the gas-barrier layer and the cover resin layer formed is almost uniform and constant. The opening metal of the container may be formed integrally with the split part of the container body in this split body-forming step, or it may be integrated with the container body after the welding step.

The welding step is for welding the split bodies that have been formed in the split body-forming step, with their ends facing each other to construct a container body. In this welding step, the split bodies maybe welded in any known welding manner of, for example, hot plate welding, ultrasonic welding, oscillation welding, etc.

The constraint layer-forming step is for forming a constraint layer as the outer layer of the container body. As so mentioned in the above, the constraint layer may be formed of a material capable of restricting the expansion of the container body. For example, when FRP is used for the material of the constraint layer, epoxy resin-infiltrated carbon fibers may be wound up to cover the outer layer of the container body and then heated to cure the epoxy resin to thereby form the constraint layer.

In the method for producing the container for high-pressure gas of the invention, when the end of the split body is formed of a cover resin layer alone, it is desirable that the welding step is followed by a gas barrier lamination step. The gas barrier lamination step is for laminating a second gas-barrier layer as the outer layer of the bonding part. The lamination may be effected in any known manner. For it, for example, employable is any known molding method of injection molding or the like, or any other working method of dipping, spraying, slush spin molding, coating, sheet lining or the like. As so mentioned hereinabove, the second gas-barrier layer thus laminated on the bonding part formed of a cover resin layer alone improves the gas-barrier property of the container.

When the end of the split body is formed of a gas-barrier layer alone, the gas-barrier property of the container may be fully improved. However, for further improving the low-temperature impact resistance of the container, it is desirable that the welding step is followed by a cover resin lamination step. The cover resin lamination step is for laminating a second cover resin layer as the outer layer of the bonding part. Like that for the gas barrier lamination step, the lamination for this may be effected in any known manner of lamination.

In the method for producing the container for high-pressure gas of the invention, the welding step may be further followed by a constraint member-forming step. The step is for forming a ring-shaped constraint member in the outer layer of the container body. The constraint member may be formed separately from the container body and it may be fitted to the outer layer of the container body, or alternatively, the constraint member may be embedded in and integrated with the container body. For example, when the material of the constraint member is the same as that of the constraint layer, the constraint member-forming step may be the same as the constraint layer-forming step.

DETAILED DESCRIPTION OF THE PREFERRED EMBODIMENTS

Embodiments of the invention are described below with reference to the drawings attached hereto.

Embodiment 1

Figure 1:
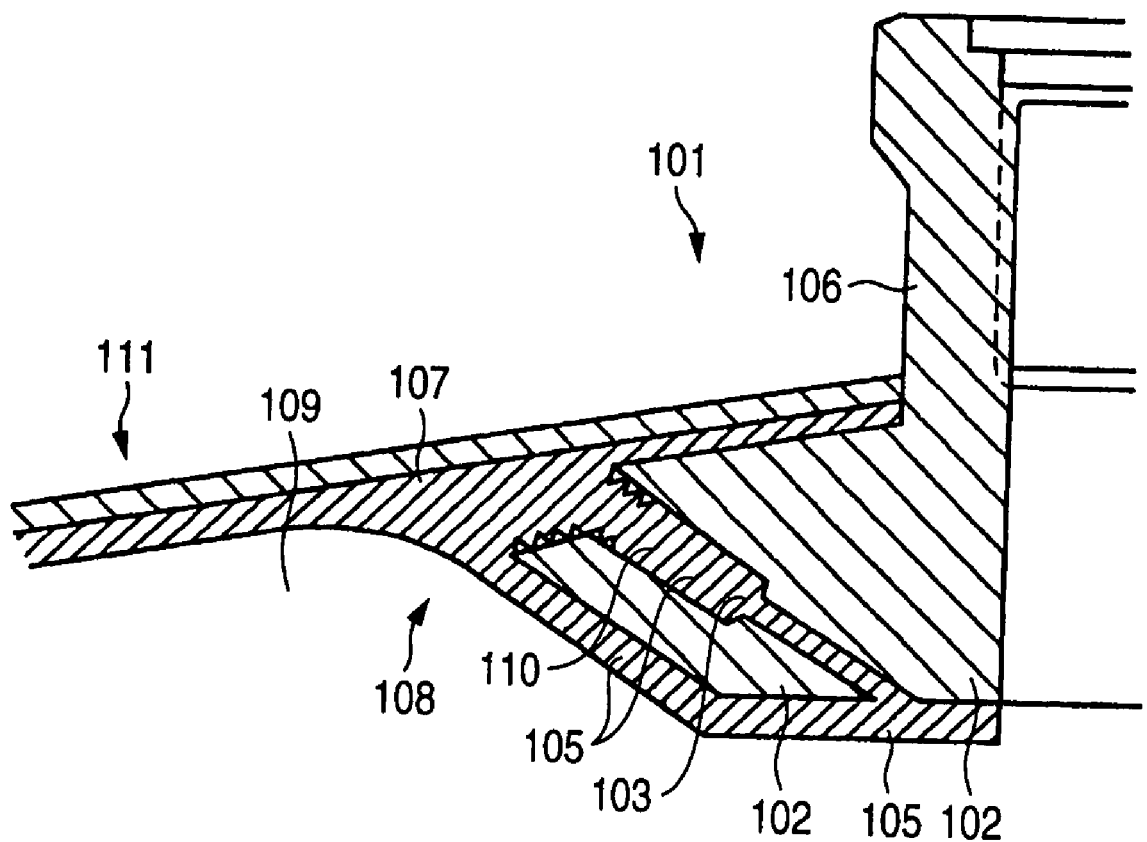
FIG. 1 is a partly-enlarged, schematic cross-sectional view that shows the liner part and the opening metal of a conventional pressure container.
Figure 2:
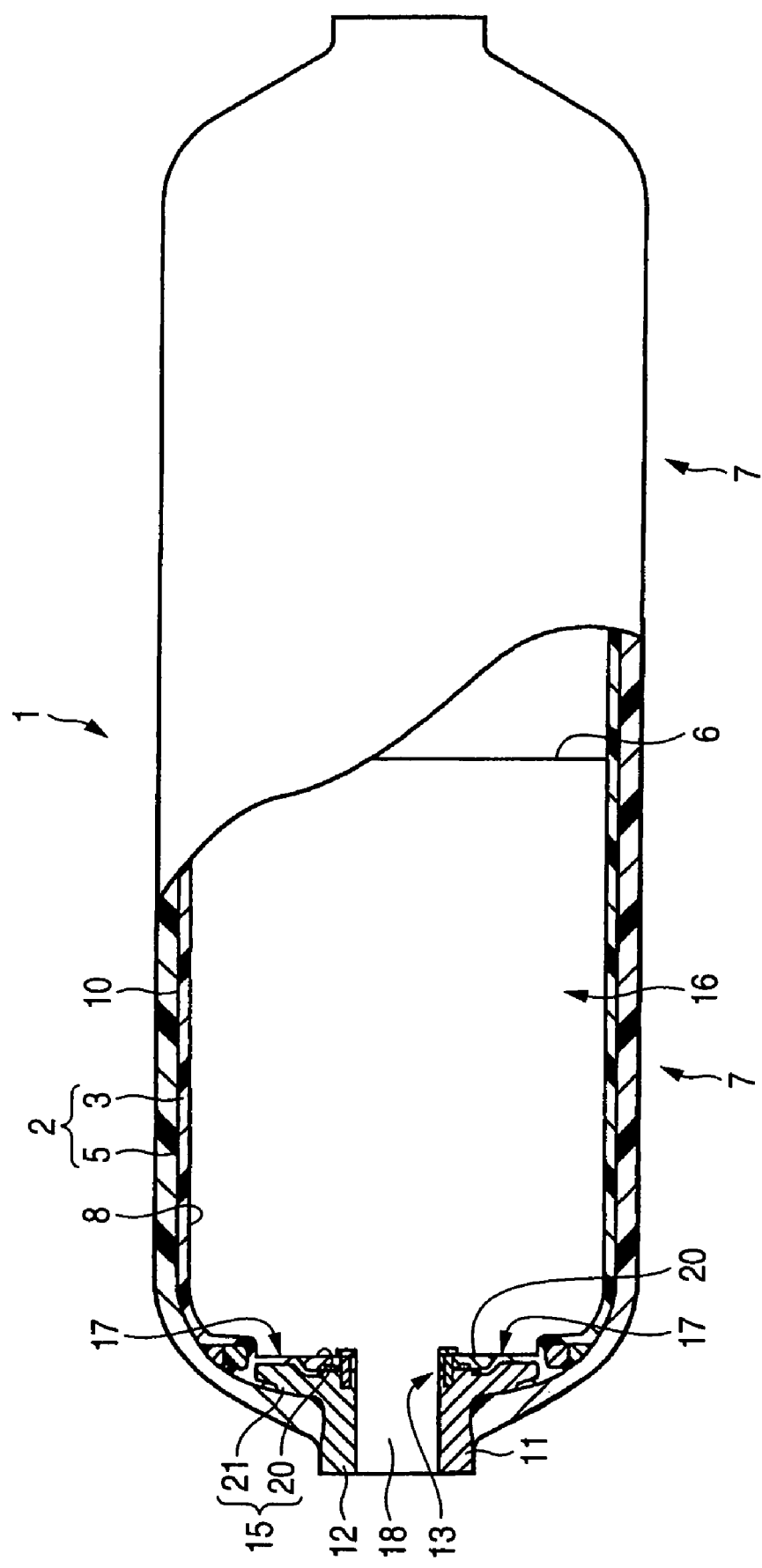
FIG. 2 is a schematic cross-sectional view of the pressure container of Embodiment 1 of the invention.
Figure 3:
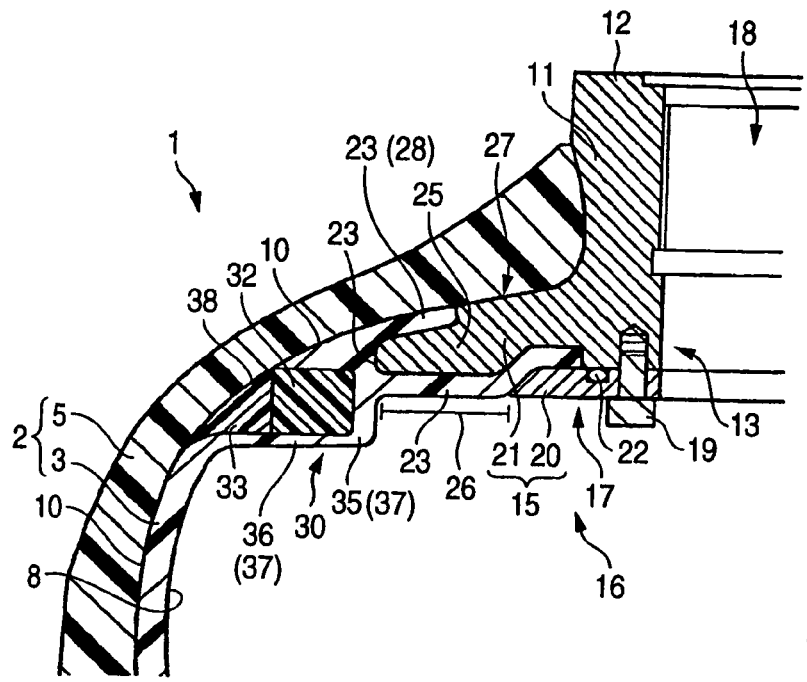
FIG. 3 is a partly-enlarged view of FIG. 2.
Figure 3A:
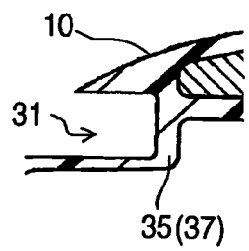
FIG. 3A is a partial schematic cross sectional view like FIG. 3 that shows a part of the liner 3 broken away and selected parts removed to illustrate a ring groove.

Embodiment 1 is to demonstrate a pressure container which has a ring-shaped constraint member around the self-sealing part and in the outer periphery of the liner and has an easily-displaceable part 37 on the outer periphery of the self-sealing part of the liner in the radial direction thereof. FIG. 2 shows a schematic cross-sectional view of the pressure container of Embodiment 1; and FIG. 3 is a partly-enlarged view of FIG. 2.

Of the pressure container of Embodiment 1, the container body 2 is composed of a constraint layer 5 and a liner 3 attached on the inner surface of the constraint layer 5. The liner 3 of the container body 2 is prepared as two parts 7 of the same shape that are split at the body center 6, and the two parts 7 are hot-sealed and integrated into the liner 3.

The liner 3 is formed of PPS (polyphenylene sulfide), and this covers the inner surface 8 of the container body 2. The constraint layer 5 is formed of FRP that contains carbon fibers and epoxy resin, and this covers the outer surface 10 of the liner 3. In this Embodiment, the liner 3 is formed of PPS. However, not limited to FPS, the liner 3 may be formed of any other known thermoplastic resin such as polyethylene or nylon.

Each split part 7 of the liner 3 is open at both ends in the axial direction thereof, and one of the two ends is nearly cylindrical and has a narrowed diameter. The peripheral edge of the opening 18 at one end having a narrowed diameter of the part 7 is formed of an opening metal 11 of metal. Of the opening metal 11, the edge 12 that is positioned on the outer edge side of the container body 2 protrudes outside the container body 2. Further, the opening metal 11 is worked to have a skirt-like flange 15 that extends in the radial direction of the container body 2, at the bonding part 13 at which the opening metal 11 bonds to the container body 2. Of the flange 15, a part of the bottom 17 that is positioned on the side of the hollow inside 16 of the container body 2 and on the side of the opening 18 thereof forms a nearly ring-like split part 20, and the split part 20 is integrated with the flange body 21 that is adjacent to the opening 18, by means of a screw 19. In the interface between the flange body 21 and the split part 20, disposed is an O-ring 22, and this acts to prevent a pressurized substance from penetrating into the interface between the flange body 21 and the split part 20.

Of the liner 3, the flange contact part 23 at which the liner 3 abuts the flange body 21 is formed thin and it covers the outer periphery 25 of the flange body 21 in the radial direction thereof. Of the flange contact part 23, a part of the self-sealing part 26 that covers the bottom 17 of the flange body 21 is put in the space between the flange body 21 and the split part 20 while held there between. Of the flange contact part 23, the holding part 28 that covers the upper part 27 of the flange body 21 is disposed in the space between constraint layer 5 and the flange 15.

The liner 3 that is positioned on the outer peripheral side 30 of the flange contact part 23 is worked to have a ring groove 31 in a part of the outer periphery of the liner 3 and along the outer periphery of the container body 2. Inside the ring groove 31, disposed is a constraint member 32 that is formed of the same material, FRP as that of the constraint layer 5. Inside the ring groove 31, the outer peripheral area of the constraint member 32 is filled with a collar 33 of PPS so that it may smoothly communicate with the outer surface 10 of the liner 3 that is positioned adjacent to the ring groove 31. Accordingly, the constraint layer 5 that covers the outer surface 10 of the liner 3 may be so formed that it may well exhibit its rigidness. In this Embodiment, the collar 33 is formed of PPS. Not limited thereto, however, it may be formed of any other thermoplastic resin such as nylon, or may be formed of metal or FRP.

The outer peripheral part 35 in the radial direction of the flange contact part 23 of the liner 3 is positioned on the side nearer to the hollow inside 16 than the self-sealing part 26 in order that a part of the wall 36 of the ring groove 31 that is positioned on the side of the hollow inside 16 may form a flat face that is parallel to the self-sealing part 26 in the position different from the position of the self-sealing part 26 in the axial direction of the container body.

A method for producing the pressure container 1 of Embodiment 1 is described below.

<1> A previously shaped flange body 21 is set in a mold, and a PPS melt is injected into the mold to form a liner 3. In this step, a flange contact part 23 is formed at around the outer peripheral part in the radial direction of the flange body 21.

<2> The flange body 21 with the flange contact part 23 formed around it is integrated with the split part 20 by means of a screw 19 to form an opening metal 11. In this step, the self-sealing part 26 of the flange contact part 23 is put in the space between the flange body 21 and the split part 20 while held there between.

<3> The split part 7 formed in <2>, which comprises the liner 3 and the opening metal 11, it taken out of the mold, and two split parts 7 are set to face each other at the body center 6 thereof, and hot-sealed and integrated together.

<4> Of the split parts 7 integrated in <3>, epoxy resin-infiltrated carbon fibers are wound up to fill the inside of the ring groove 31 of the liner 3, and then heated to cure the epoxy resin, thereby forming a constraint member 32 therein. Further, the outer peripheral area of the constraint member 32 inside the ring groove 31 is filled with a collar 33 to thereby remove the level difference on the outer surface 10 of the liner 3 with the ring groove 31 formed therein, and the outer surface 10 of the liner 3 is thereby made to have a smoothly continuing face.

<5> Epoxy resin-infiltrated carbon fibers are wound around the outer surface 10 of the liner 3 to cover it, and then heated to cure the epoxy resin to thereby form a constraint layer 5. One opening 18 is stopped up with a blank cap (not shown). The process comprising the above steps <1> to <5> gives the pressure container 1 of this Embodiment 1.

In the pressure container 1 of Embodiment 1, the constraint member 32 is provided in the outer periphery of the liner 3 at the outer peripheral side 30 of the flange contact part 23. Therefore, when a pressurized substance is filled in the hollow inside 16 of the pressure container 1 and even when the pressure container 1 is thereby expanded, the diameter expansion of the liner 3 that is positioned on the inner peripheral side of the constraint member 32 is restricted. Accordingly, pulling the self-sealing part 26 by the diameter expansion of the liner 3 is prevented or restricted, and the bonding between the self- sealing part 26 and the flange 15 is kept good, and the sealability of the self-sealing part 26 is thereby improved.

In addition, since the easily-displaceable part 37 is formed thin and it is readily elongable and deformable. Further, since the easily-displaceable part 37 is so formed that it gives a flat face that is parallel to the self-sealing part 26 at a position different from the position of the self-sealing part 26 in the axial direction of the container body, the elongable and deformable length of the easily-displaceable part 37 increases even in the axial direction and the degree of elongation and deformation of the easily-displaceable part 37 further increases. Accordingly, the tension of the self-sealing part 26 owing to the diameter expansion of the liner 3 can be surely absorbed by the elongation and deformation of the easily-displaceable part 37, and, as a result, the bonding between the self-sealing part 26 and the flange 15 is kept good and the seal ability of the self-sealing part is further improved.

Moreover, since the opening metal 11 is composed of the flange body 21 and the split part 20 and since the flange body 21 is integrated with the split part 20 after the flange contact part 23 is formed in a mode of injection molding, short shots may be prevented in forming the thin, self-sealing pat 26 in the space of the flange 15, and therefore good and easy molding to form it is possible. Of the flange contact part 23, a part of the self-sealing part 26 is held by the flange body 21 and the split part 20 while sandwiched there between, and therefore the bonding between the self-sealing part and the flange 15 is kept further better.

Embodiment 2

Figure 4:
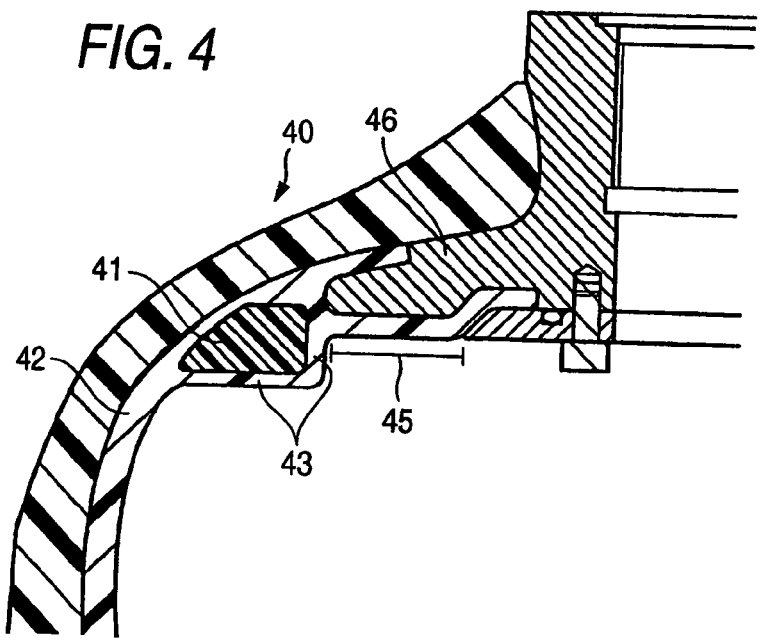
FIG. 4 is a partly-enlarged, schematic cross-sectional view of the pressure container of Embodiment 2 of the invention.

Embodiment 2 is to demonstrate a pressure container that is fabricated in the same manner as in Embodiment 1 except that the constraint member is embedded in the liner and is integrated with the liner. FIG. 4 is a partly-enlarged, schematic cross-sectional view of the pressure container of Embodiment 2.

In the pressure container 40 of Embodiment 2, the constraint member 41 is embedded in the liner 42 and is integrated with the liner 42. Therefore, the process for producing the pressure container in this Embodiment may be simplified. In addition, like in Embodiment 1, the pressure container of this Embodiment also has the constraint member 41 and the easily-displaceable part 43, and therefore the bonding between the self-sealing part 45 and the flange 46 in this is also kept good.

Embodiment 3

Figure 5:
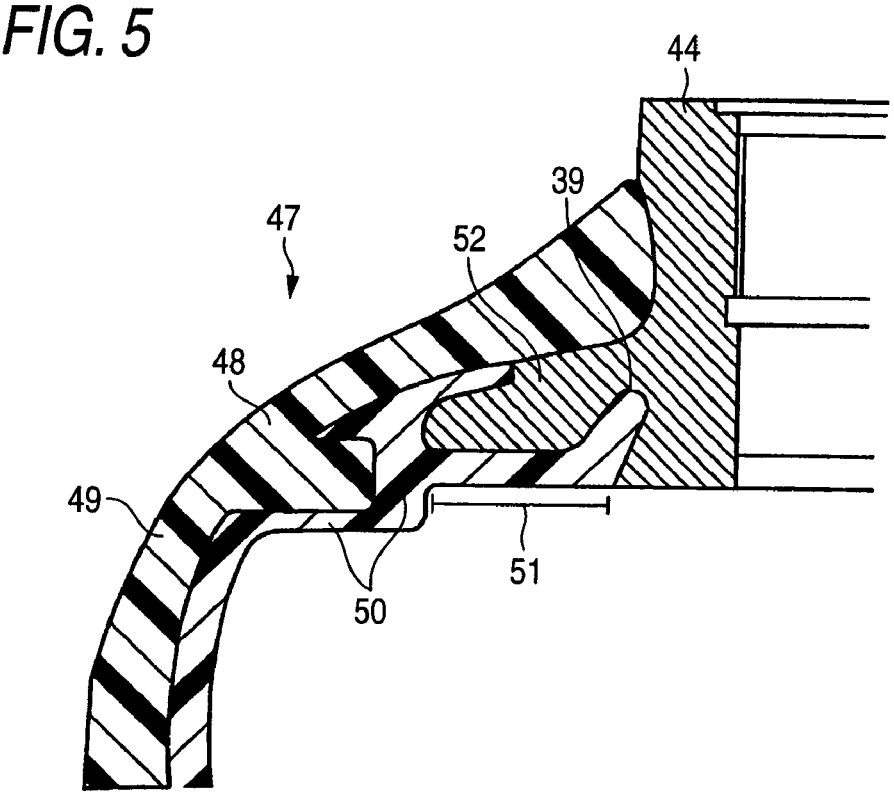
FIG. 5 is a partly-enlarged, schematic cross-sectional view of the pressure container of Embodiment 3 of the invention.

Embodiment 3 is to demonstrate a pressure container that is the same as that of Embodiment 1 except that the constraint member is integrated with the constraint layer and the flange is the flange body alone. FIG. 5 is a partly-enlarged, schematic cross-sectional view of the pressure container of Embodiment 3.

In the pressure container 47 of Embodiment 3, the flanges 52 is the flange body 44 alone, and the flange body 44 is processed to have a groove 39 in the circumferential direction thereof. In the pressure container 47 of this Embodiment 3, a part of the self-sealing part 51 is formed to be filled inside the groove 39, and therefore the self-sealing part 51 is held by the groove 39.

In the pressure container 47 of Embodiment 3, the constraint member 48 is integrated with the constraint layer 49. Therefore, the process for producing the pressure container in this Embodiment may be simplified. In addition, like in Embodiment 1, the pressure container of this Embodiment also has the constraint member 48 and the easily-displaceable part 50, and therefore the bonding between the self-sealing part 51 and the flange 52 in this is also kept good.

Embodiment 4

Figure 6:
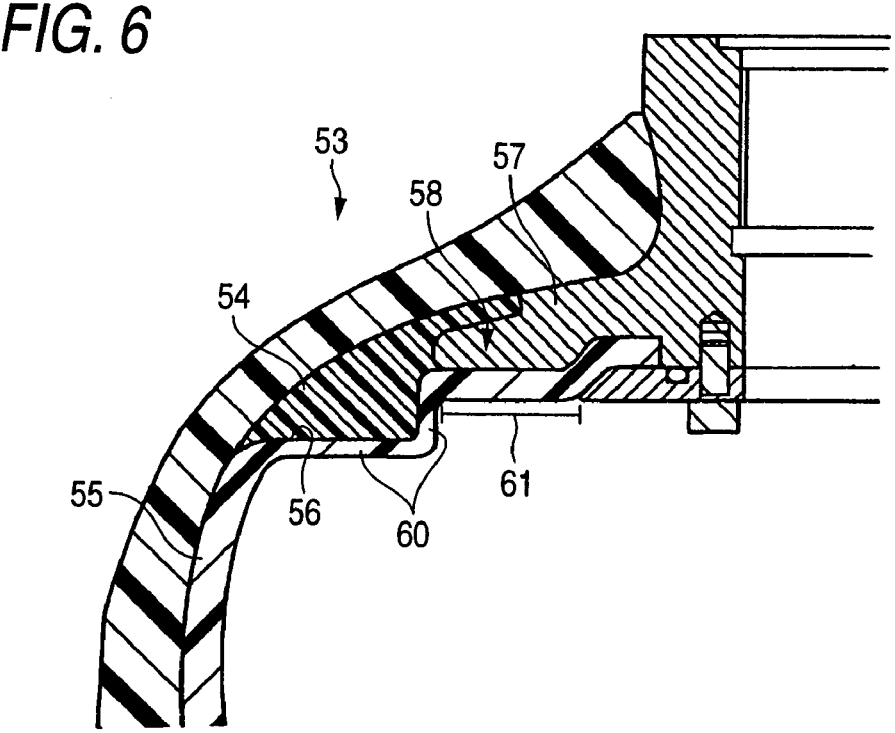
FIG. 6 is a partly-enlarged, schematic cross-sectional view of the pressure container of Embodiment 4 of the invention.

Embodiment 4 is to demonstrate a pressure container that is the same as that of Embodiment 1 except that the self-sealing part is formed to cover only the bottom of the flange body and the constraint member is provided adjacent to the ring groove of the liner and to the outer periphery of the flange in the radial direction thereof. FIG. 6 is a partly-enlarged, schematic cross-sectional view of the pressure container of Embodiment 4.

In the pressure container 53 of Embodiment 4, the constraint member 54 is provided adjacent to the ring groove 56 of the liner 55 and to the outer periphery 58 of the flange 57 in the radial direction thereof. Like in Embodiment 1, the pressure container also has the constraint member 54 and the easily-displaceable part 60, and therefore the bonding between the self-sealing part 61 and the flange 57 in this is also kept good.

Embodiment 5

Figure 7:
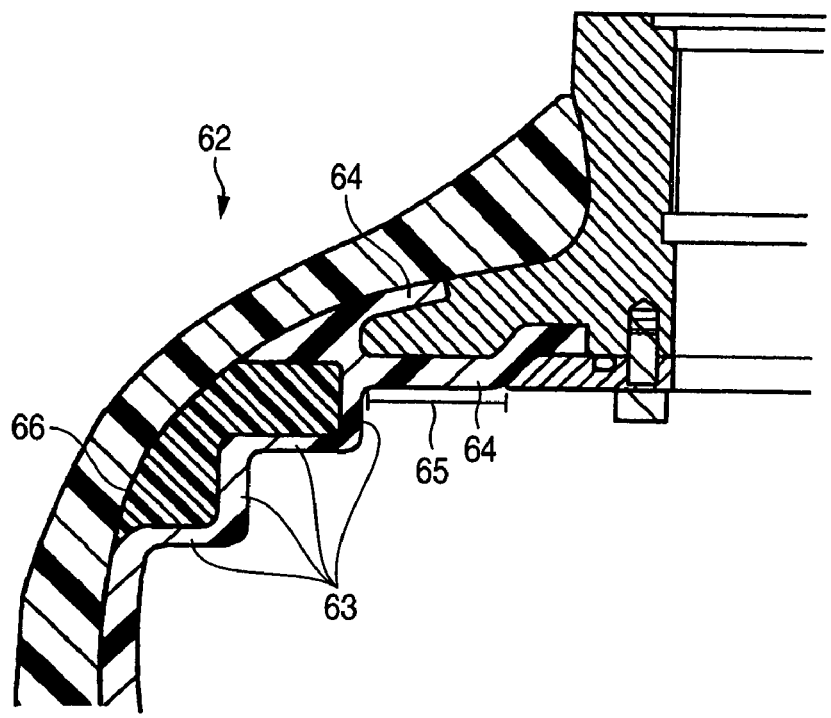
FIG. 7 is a partly-enlarged, schematic cross-sectional view of the pressure container of Embodiment 5 of the invention.

Embodiment 5 is to demonstrate a pressure container that is the same as that of Embodiment 1 except that the easily-displaceable part is formed like a two-step ladder of which the two steps extend nearly in parallel to the self-sealing part at different two positions both differing from the position of the self-sealing part, and the constraint member is formed in accordance with the form of the two-step ladder for the easily-displaceable part. FIG. 7 is a partly-enlarged, schematic cross-sectional view of the pressure container of Embodiment 5.

In the pressure container 62 of Embodiment 5, the easily-displaceable part 63 is formed like a two-step ladder of which the two steps extend nearly in parallel to the self-sealing part 65 at different two positions both differing from the position of the self-sealing part 65, and therefore the elongable and deformable length of the easily-displaceable part 63 further increases, and the tension of the flange contact part 64 by the diameter expansion of the liner 66 may be more favorably absorbed by the elongation and deformation of the easily-displaceable part 63.

Embodiment 6

Figure 8:
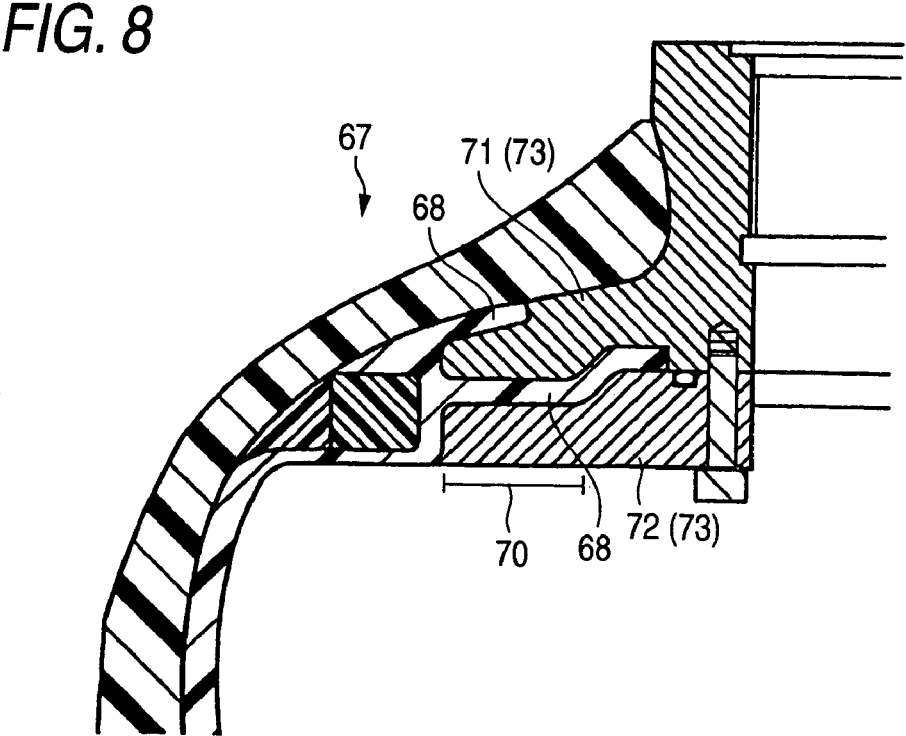
FIG. 8 is a partly-enlarged, schematic cross-sectional view of the pressure container of Embodiment 6 of the invention.

Embodiment 6 is to demonstrate a pressure container that is the same as that of Embodiment 1 except that the split part of the flange covers the entire bottom of the flange, and the self-sealing part of the flange contact part is entirely sandwiched between the split part and the flange body. FIG. 8 is a partly-enlarged, schematic cross-sectional view of the pressure container of Embodiment 6.

In the pressure container 67 of Embodiment 6, the self-sealing part 70 of the flange contact part 68 is entirely sandwiched between the flange body 71 and the split part 72, and therefore, the bonding between the self-sealing part 68 and the flange 73 is kept good and the seal ability of the self-sealing part is further better.

As described hereinabove, when the pressure container of the invention is filled with a pressurized substance and even when it is thereby expanded, the constraint member provided in the outer periphery of the liner that is positioned around the self-sealing part thereof acts to restrict the diameter expansion of the liner, and, as a result, pulling the self-sealing part to be caused by the diameter expansion of the liner may be prevented or restricted. Accordingly, the bonding between the self-sealing part and the flange is kept good, and the seal ability of the self-sealing part is thereby improved.

In addition, since the easily-displaceable part that is readily elongable and deformable is provided in the outer peripheral part of the self-sealing part of the liner in the radial direction thereof, the tension of the self-sealing part owing to the diameter expansion of the liner may be surely absorbed by the elongation and deformation of the easily-displaceable part, and therefore the bonding between the self-sealing part and the flange is kept further better, and the seal ability of the self-sealing part is thereby improved more.

In the above described Embodiments 1 though 6, the liners are formed of PPS. However, the liners may be formed of a laminate structure including a gas barrier-layer of EVOH or the like and a cover resin layer of polyethylene or the like. The detailed structure for such laminate structures will be described in the following Embodiments.

Embodiment 7

Figure 9:
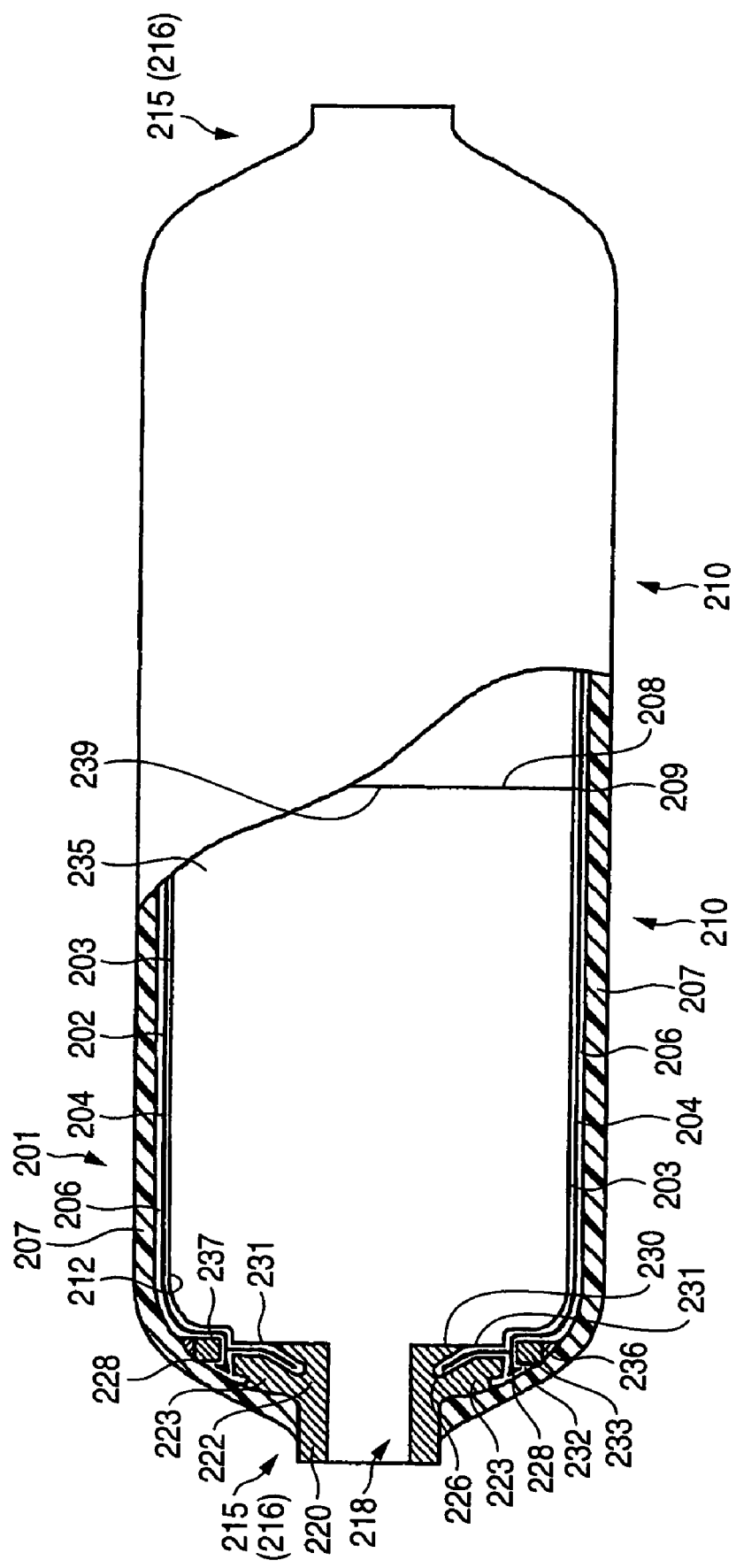
FIG. 9 is a schematic cross-sectional view of the high-pressure gas container of Embodiment 7 of the invention.
Figure 10:
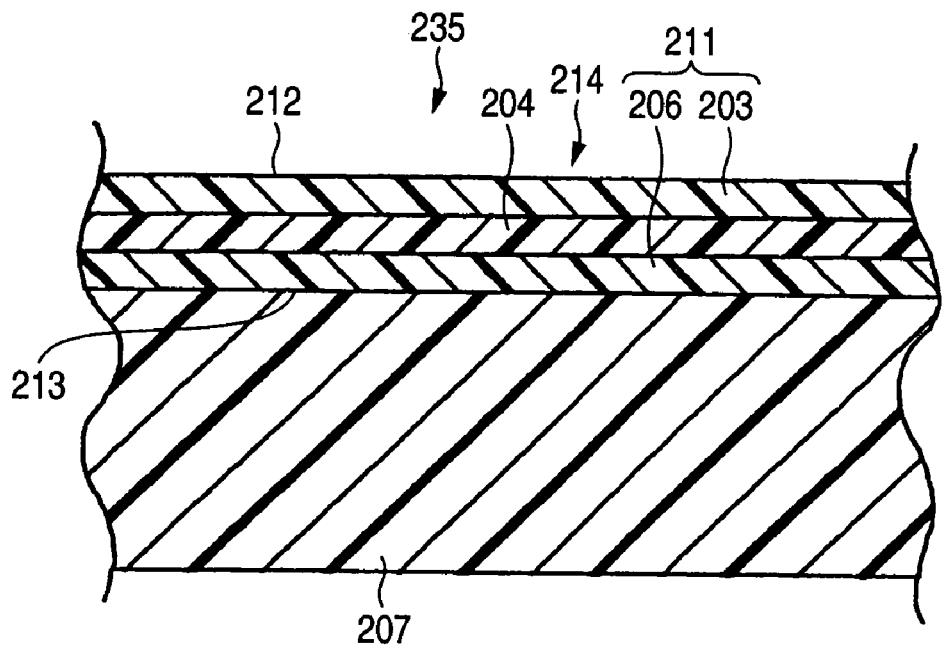
FIG. 10 is a partly-enlarged view of FIG. 9.
Figure 11:
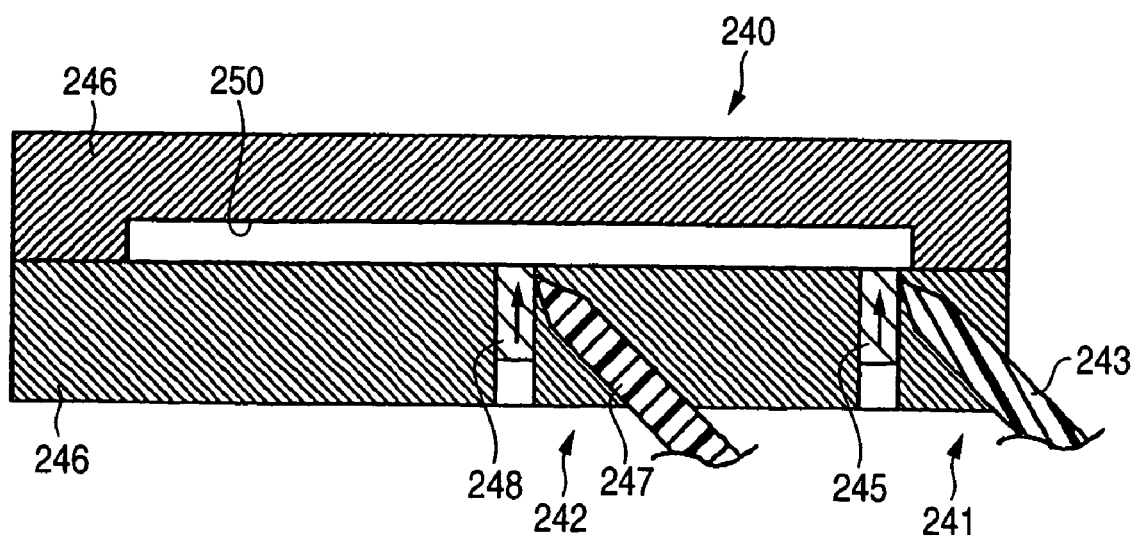
FIG. 11 is a schematic cross-sectional view showing the container body and the production units in a production step for it in Embodiment 7 of the invention.

Embodiment 7 is to demonstrate a container for high-pressure gas, which has a multi-layered structure with a cover resin layer formed as the inner layer and the outer layer of the gas-barrier layer and which has a constraint layer of FRP as the outer layer of the container body. FIG. 9 shows a schematic cross-sectional view of the container for high-pressure gas of Embodiment 7; and FIG. 10 is a partly-enlarged view of FIG. 9.

The container body 202 of the container 201 for high-pressure gas of this Embodiment 7 has a three-layered structure that comprises an inner cover resin layer 203, a gas-barrier layer 204 and an outer cover resin layer 206 as laminated in that order from the inside of the body, and a constraint layer 207 is further formed as the outer layer of the container body 202. Thus, the container 201 has a four-layered structure. Of the layers, the three-layered part that comprises the inner cover resin layer 203, the gas-barrier layer 204 and the outer cover resin layer 206 forms the multi-layered structure 214. The container body 202 is prepared as two parts 210 of the same shape that are split at the body center 208, and the two parts 210 are hot-welded and integrated into one at the bonding part 209.

The two-layered cover resin layer 211 that comprises the inner cover resin layer 202 and the outer cover resin layer 206 is formed of a material of polyethylene resin. Of those, the inner cover resin layer 203 is to form the innermost layer 212 of the container body 202, and the outer cover resin layer 206 is to form the outermost layer 213 of the container body 202.

The gas barrier layer 204 is formed of a material of EVOH, and it is sandwiched between the inner cover resin layer 203 and the outer cover resin layer 206. The cover resin layer is formed to have a thickness of from 0.1 to 5 mm or so, and the gas-barrier layer is also to have a thickness of from 0.1 to 5 m or so.

Each split part 210 of the container body 202 is open at both ends in the axial direction thereof, and one end 215 of the two is nearly cylindrical and has a narrowed diameter. The peripheral edge of the opening 216 at one end 215 having a narrowed diameter of the split part is formed of an opening metal 218 of metal. Of the opening metal 218, the edge 220 that is positioned on the outer edge side of the container body 202 protrudes outside the container body 202. Further, the opening metal 218 is worked to have a skirt-like flange 223 that extends in the radial direction of the container body 202, at the bonding part 222 at which the opening metal 218 bonds to the container body 202. On the outer side of the opening metal 218 in the radial direction thereof, a ring-shaped engagement groove 226 is formed that extends nearly in the thickness direction of the opening metal 218.

A flange contact part 228, that covers the outer periphery of the opening metal 218, is formed in the container body 202 at an area with which the opening metal 218 is brought into abutment. Of the flange contact part 228, a part of the self-sealing part 231 that covers the bottom 230 of the flange 223 is held in side the engagement groove 226 formed in the opening metal 218.

On a part of the container body 202 that is positioned on the outer peripheral side of the flange contact part 228, a ring groove 232 is formed along the outer periphery of the container body 202. In the ring groove 232, a ring-shaped constraint member 233 that is formed of the same material of FRP as the constraint layer 207 is inserted. When a high-pressure gas is filled in the hollow inside 235 of the container body 202 and even when the high-pressure gas container 201 is thereby expanded, the expansion of the container body 202 is restricted, and therefore pulling the self-sealing part 231 by the body expansion is prevented or restricted, and the bonding between the self-sealing part 231 and the flange 223 is kept good. In the ring groove 232, a collar 236 of PPS is filed around the constraint member 233 so that it communicates smoothly with the outer surface of the container body 202 that is positioned adjacent to the ring groove 232. Accordingly, the constraint layer 207 that covers the outer surface of the container body 202 is so formed that the container may well exhibit its pressure resistance.

Of the container body 202, the part that is positioned on the outer peripheral side of the flange contact part 228 in the radial direction thereof is formed thin to be an easily-displaceable part 237 that is readily elongable and deformable. Accordingly, even when the diameter of the container body 202 expands, the tension of the self-sealing part 231 can be absorbed by the elongation and deformation of the easily-displaceable part 237, and, as a result, the bonding between the self-sealing part 231 and the flange 223 is kept better.

In the high-pressure gas container 201 of this Embodiment 7, the penetration of the high-pressure gas filled in the hollow inside 235 of the container body 202 toward the outside of the hollow is shielded by the gas-barrier layer 204. Since the gas-barrier layer 204 is formed of a material of EVOH and since it exhibits a good gas-barrier property even against low-molecular-weight gases such as hydrogen gas, the high-pressure gas container 201 of this Embodiment 7 may be favorably used for filling and discharging not only high-molecular-weight gases but also low-molecular-weight gases in and out of it. In addition, the cover resin layer 211 is formed as the inner layer and the outer layer of the gas-barrier layer 204, and the cover resin layer 11 reinforces the gas-barrier layer 204. Accordingly, even though EVOH of poor low-temperature impact resistance is used for the material of the gas-barrier layer 204, the mechanical strength of the gas container is still good even at low temperatures of, for example, −30° C. or lower, and the gas container may be favorably used even at such low temperatures. In addition, since the outer layer of the container body 202 is not only formed of the constraint layer 207 of FRP capable of restricting the expansion of the container body 202 but also provided with the ring-shaped constraint member 233, the pressure resistance of the high-pressure gas container 201 of this Embodiment 7 is improved more, and the container 201 is more favorable for high-pressure gas.

The high-pressure gas container 201 of Embodiment 7 is produced according to the method for producing a container for high-pressure gas of the invention, and its container body 202 is formed in a mode of twin-cylinder molding. In Embodiment 7, two splits parts 210 of the container body 202 are first formed, and the two parts 210 are welded at their ends 239 and are thereby integrated into one. The container body 202 of Embodiment 7 and the device for producing it are illustrated as schematic cross-sectional views of FIG. 11 to FIG. 14 that separately show the production steps. The method for producing the high-pressure gas container of Embodiment 7 is described below. The method comprises a split body-forming step, a welding step, a constraint member-forming step, and a constraint layer-forming step.

1-1. Split Body-Forming Step (Preparative Step):

The high-pressure gas container 1 of Embodiment 7 is produced in a mode of twin-cylinder molding. The twin-cylinder molding device 240 comprises a first injection unit 241 for forming the cover resin layer 211 and the second injection unit 242 for forming the gas barrier layer 204. The nozzle head 243 of the first injection unit communicates with the mold 246 via a valve gate 245, and the nozzle head 247 of the second injection unit 242 with the mold 246 via a valve gate 248. The second injection unit 242 and the second valve gate 248 are connected to a delay timer (not shown) by which the injection and the gate opening for the former is retarded than that for the first injection unit 241 and the first valve gate 245.

In this preparative step, an opening metal 218 (not shown) is disposed on the mold face 250 of the mold 246. With that, polyethylene resin for forming a cover resin layer 211 is put into the first injection unit 241 and heated and melted therein at a predetermined temperature while the first valve gate 204 is closed, as in FIG. 11. In addition, EVOH for forming a gas-barrier layer 204 is put into the second injection unit 242 and heated and melted therein at a predetermined temperature while the second valve gate 248 is closed.

Figure 12:
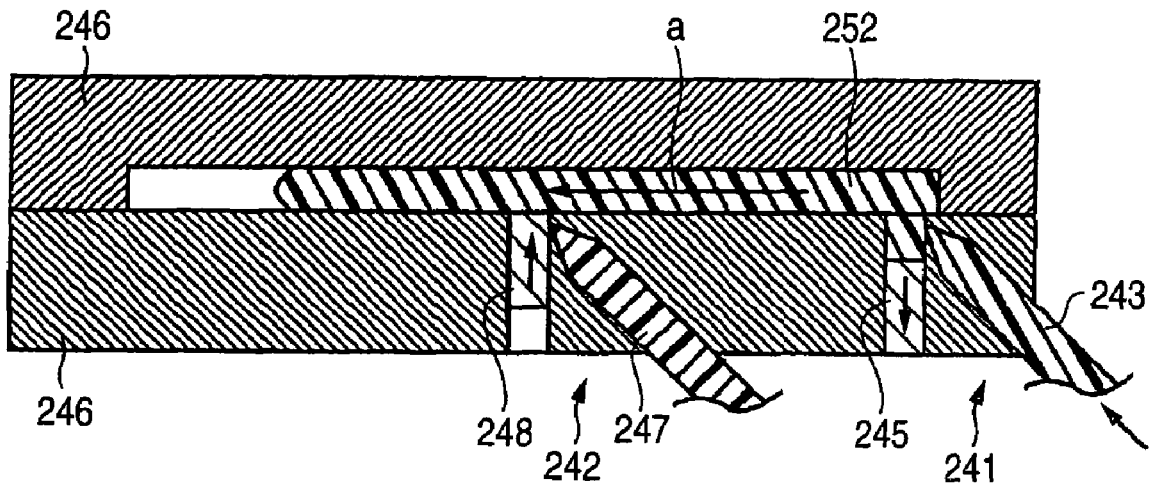
FIG. 12 is a schematic cross-sectional view showing the container body and the production units in a production step for it in Embodiment 7 of the invention.

1-2. Split Body-Forming Step (First Injection Step):

In this first injection step, the first valve gate 245 is opened while the second valve gate 248 is still closed, and the polyethylene resin melt 252 is injected into the mold 246 from the injection unit 241, as in FIG. 12. In this stage, the polyethylene resin melt 252 runs to fill the space in the direction of the arrow a, and it reaches the site over the second valve gate 248.

Figure 13:
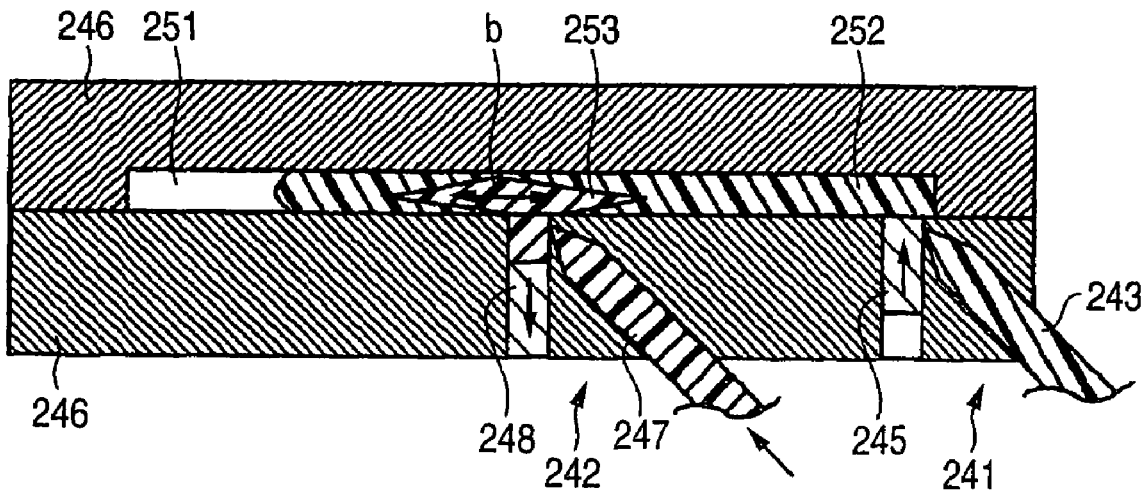
FIG. 13 is a schematic cross-sectional view showing the container body and the production units in a production step for it in Embodiment 7 of the invention.
Figure 14:
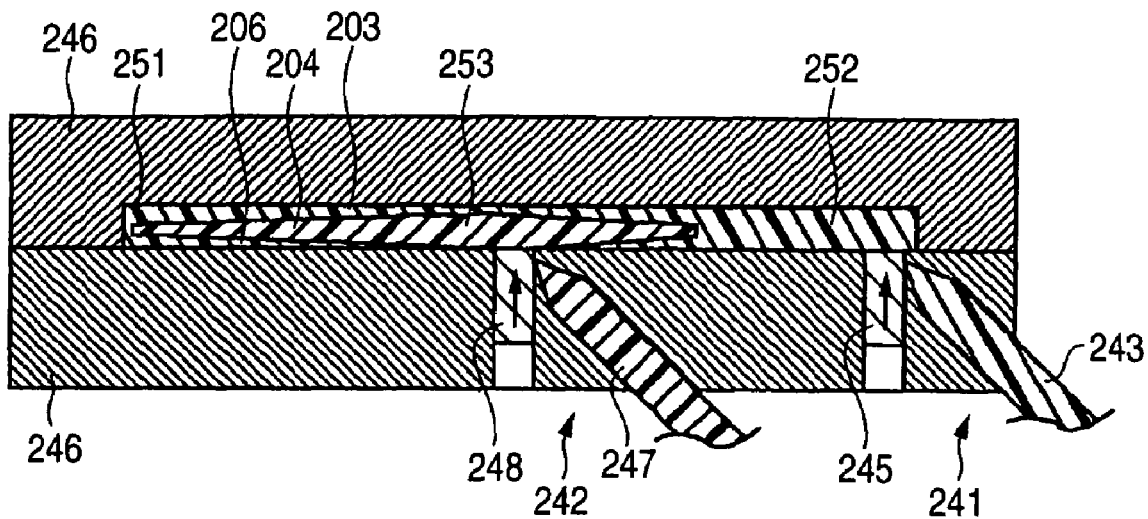
FIG. 14 is a schematic cross-sectional view showing the container body and the production units in a production step for it in Embodiment 7 of the invention.

1-3. Split Body-Forming Step (Second Injection Step):

In this second injection step, the first valve gate 245 is closed, and the second valve gate 248 is opened by the action of the delay timer and an EVOH melt 253 is injected into the mold 246 from the second injection unit 242, as in FIG. 13.

In this stage, the EVOH melt 253 runs into the layer of the polyethylene resin melt 252 that has been formed in the first injection step, in the direction of the arrow b. Owing to the injection pressure of the EVOH melt 253 in this stage, the polyethylene resin melt 252 that has been injected into the mold in the first injection step is further pressed in the direction of the arrow a from its position, and it reaches the cavity end 251 of the mold 246 further remoter from the valve gate 248.

1-4. Split Body-Forming Step (Cooling Step):

After the EVOH melt 253 has been completely injected into the mold from the second injection unit 242, then the second valve gate 248 is closed. In this stage, the mold 246 is filled with the polyethylene resin melt 252 to form the inner cover resin layer 203 and the outer cover resin layer 206 and with the EVOH melt 253 to form the gas-barrier layer 204, as in FIG. 14. The EVOH melt 253 fills the space in the two-layered polyethylene resin melt 252, forming a thin layer having a nearly uniform thickness therein. In this cooling step, the mold 246 is cooled to solidify the inner cover resin layer 203, the outer cover resin layer 206 and the gas-barrier layer 4, thereby forming the split part 210 of a container body 202. In this stage, the split part 210 of a container body 202 is integrated with an opening metal 218 (not shown) In this split body-forming step, the multi-layered structure 214 is formed that comprises the inner cover resin layer 203, the outer cover resin layer 206 and the gas-barrier layer 204.

2. Welding Step:

The split part 210 integrated with the opening metal 218 of a container body 202 that has been formed in the steps 1-1 to 1-4 is taken out of the mold 246, and two split parts 210 are thermally welded at their ends 239 to form the bonding part 209, and are thus integrated into a container body 202.

3. Constraint member-Forming Step:

Of the integrally formed container body 202, epoxy resin-infiltrated carbon fibers are wound up to fill the inside of the ring groove 232, and then heated to cure the epoxy resin, thereby forming a constraint member 233 therein. Further, the outer peripheral area of the constraint member 233 inside the ring groove 232 is filled with a collar 236 to thereby remove the level difference on the outer surface 213 of the container body 202 with the ring groove 232 formed therein, and the outer surface 213 of container body 202 is thereby made to have a smoothly continuing face.

4. Constraint layer-Forming Step:

Epoxy resin-infiltrated carbon fibers are wound around the outer surface 213 of the container body 202 to cover it, and then heated to cure the epoxy resin to thereby form a constraint layer 207. One opening 216 is stopped up with a blank cap (not shown). The process comprising the above steps 1 to 4 gives the high-pressure gas container 1 of this Embodiment 7.

According to the method of producing the high-pressure gas container of Embodiment 7, the container body 202 is formed in a mode of twin-cylinder forming. Therefore, the gas-barrier layer 204 and the cover resin layer 211 can be readily formed by the use of any already-existing molding machine, and, in addition, they do not require any other different types of molds than the mold 246. Accordingly, the cost for the mold 246 may be reduced. Moreover, it is easy to make the thickness of the gas barrier layer 204 almost uniform and constant.

Embodiment 8

Figure 15:
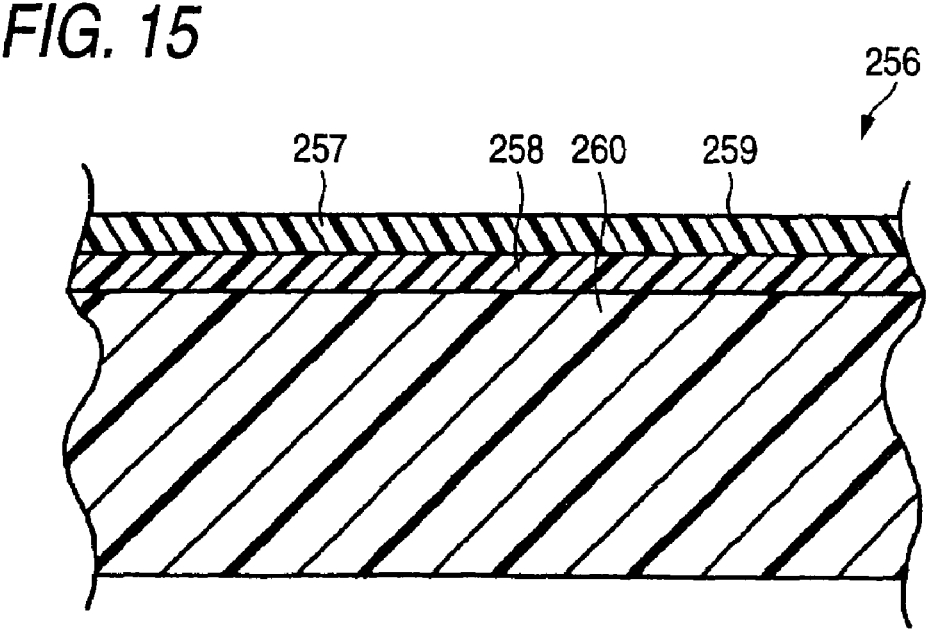
FIG. 15 is a partly-enlarged, schematic cross-sectional view of the high-pressure gas container of Embodiment 8 of the invention.

Embodiment 8 is to demonstrate a container for high-pressure gas that has the same shape as that of the container of Embodiment 7 except that the cover resin layer is formed only as the outer layer of the gas-barrier layer. FIG. 15 is a partly-enlarged, schematic cross-sectional view of the high-pressure gas container of Embodiment 8.

The container body of the high-pressure gas container of Embodiment 8 has a two-layered structure that comprises a gas-barrier layer 257 and a cover resin layer 248, and a constraint layer 260 is further formed as the outer layer of the container body. Thus, the container has a three-layered structure. Of the layers, the two-layered part that comprises the gas-barrier layer 257 and the cover resin layer 258 forms the multi-layered structure 259. Like that in Embodiment 7, the high-pressure gas container of this Embodiment 8 exhibits a good gas-barrier property not only against high-molecular-weight gases but also even against low-molecular-weight gases owing to its gas-barrier layer 257 formed of EVOH, and it is therefore favorably used as a container for filling and discharging various gasses irrespective of their molecular weight in and out of it. In addition, since the cover resin layer 258 is formed of polyethylene resin of good low-temperature impact resistance as the outer layer of the gas-barrier layer 257, the mechanical strength of the container is ensured even at low temperatures, and the container may be favorably used even at low temperatures. Moreover, since the constraint member 233 of FRP is formed in the outer layer of the container body 256, the container of this Embodiment is usable for filling and discharging high-pressure gas in and out of it, like the high-pressure gas container 1 in Embodiment 7.

The container body of the high-pressure gas container of Embodiment 8 is formed in a mode of insert molding.

Figure 16:
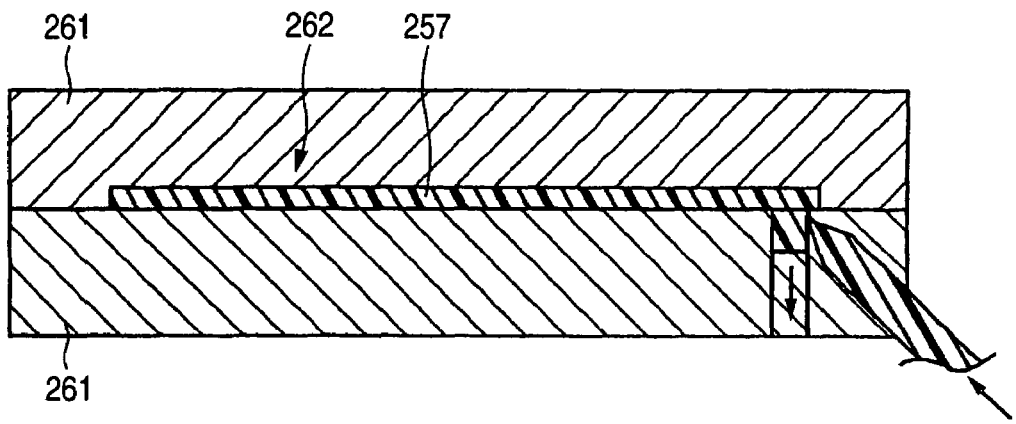
FIG. 16 is a schematic cross-sectional view showing the container body and the production units in a production step for it in Embodiment 8 of the invention.

The container body of Embodiment 8 and the device for producing it are illustrated as schematic cross-sectional views of FIG. 16 and FIG. 17 that separately show the production steps, and the method for producing the high-pressure gas container of Embodiment 8 is described below.

1-1. Split Body-Forming Step (First Molding Step):

The high-pressure gas container of Embodiment 8 is produced in a mode of insert molding. In the first molding step of Embodiment 8, an opening metal (not shown) is disposed in the first mold 261, and an EVOH melt heated and melted at a predetermined temperature like in Embodiment 7 is injected into the first mold 261, then cooled and solidified to form a first molding 262 of the gas-barrier layer 257 integrated with the opening metal, as in FIG. 16.

Figure 17:
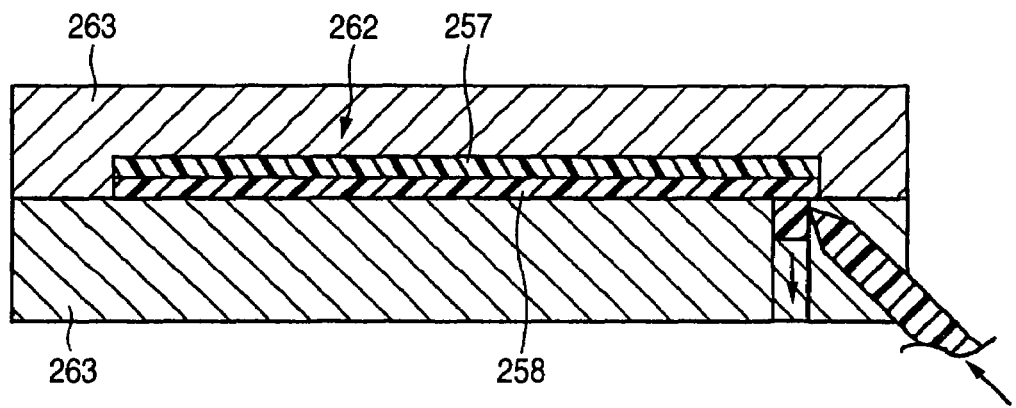
FIG. 17 is a schematic cross-sectional view showing the container body and the production units in a production step for it in Embodiment 8 of the invention.

1-2. Split Body-Forming Step (Second Molding Step):

In the second molding step, the first molding 262 obtained in the first molding step is disposed in a second mold 263 and subjected to insert molding therein to thereby form a cover resin layer 258 as the outer layer of the gas-barrier layer 257 integrated with the opening metal, as in FIG. 17. The cover resin layer 258 is formed by injecting a polyethylene resin melt that has been heated and melted at a predetermined temperature as in Embodiment 7, followed by cooling and solidifying it. Through the first molding step and the second molding step for the split body-forming step, a split part of a container body integrated with an opening metal is formed. In the second molding step, formed is the split part of a container body that has a two-layered structure of the gas-barrier layer 257 and the cover resin layer 258. Apart from it, however, a three-layered structure may also be formed for it, that comprises an inner cover resin layer, a gas-barrier layer and an outer cover resin layer, for example, like in Embodiment 7. In this case, for example, the first molding 262 is spaced from the mold face of the second mold 263 by fixing it with pins or the like, and a cover resin layer 258 is formed as the inner layer and the outer layer of the first molding 262 in that condition. As a result, a split part of the container body 256 is readily formed, having a three-layered structure that comprises the cover resin layer 258, the gas barrier layer 257 and the cover resin layer 258.

2. Welding Step:

The split parts of the container body obtained in the split body-forming step are welded in the same manner as in Embodiment 7 to construct a container body integrated with an opening metal.

Next, this is further processed in the constraint member-forming step and the constraint layer-forming step as in Embodiment 7 to form a constraint member (not shown) and a constraint layer 260, thereby completing the high-pressure gas container of Embodiment 8.

Embodiment 9

Figure 18:
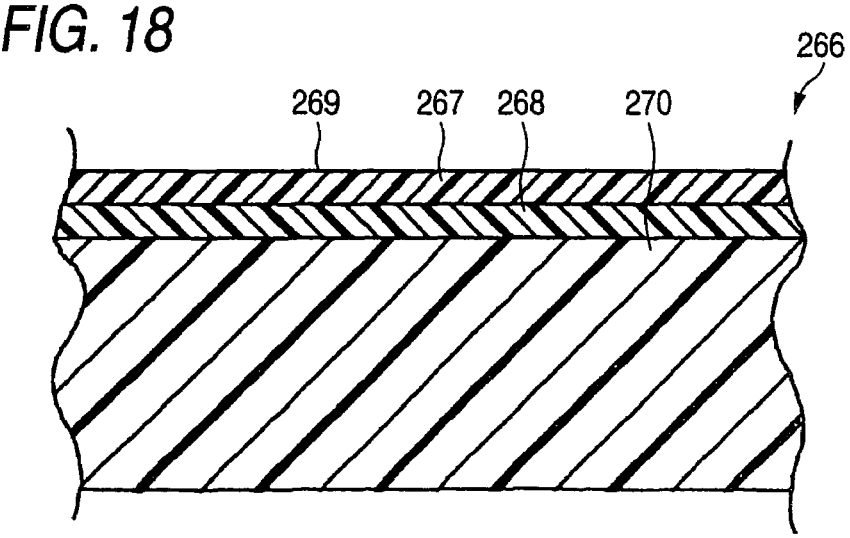
FIG. 18 is a partly-enlarged, schematic cross-sectional view of the high-pressure gas container of Embodiment 9 of the invention.

Embodiment 9 is to demonstrate a container for high-pressure gas that has the same shape as that of the container of Embodiment 7 except that the cover resin layer is formed only as the inner layer of the gas-barrier layer. FIG. 18 is a partly-enlarged, schematic cross-sectional view of the high-pressure gas container of Embodiment 9.

The container body of the high-pressure gas container of Embodiment 9 has a two-layered structure that comprises a cover resin layer 267 and a gas-barrier layer 268, and a constraint layer 270 is further formed as the outer layer of the container body. Thus, the container has a three-layered structure. Of the layers, the two-layered part that comprises the cover resin layer 267 and the gas-barrier layer 268 forms the multi-layered structure 269. Like that in Embodiments 7 and 8, the high-pressure gas container of this Embodiment 9 exhibits a good gas-barrier property not only against high-molecular-weight gases but also even against low-molecular-weight gases owing to its gas-barrier layer 268 formed of EVOH, and it is therefore favorably used as a container for filling and discharging various gasses irrespective of their molecular weight in and out of it. In addition, since the cover resin layer 267 is formed of polyethylene resin of good low-temperature impact resistance as the inner layer of the gas-barrier layer 268, the mechanical strength of the container is ensured even at low temperatures, and the container may be favorably used even at low temperatures. Moreover, since the constraint layer 270 of FRP is formed as the outer layer of the container body 266 and since a constraint member (not shown) is formed, the container of this Embodiment is usable for filling and discharging high-pressure gas in and out of it, like the high-pressure gas containers in Embodiments 7 and 8.

Embodiment 10

Figure 19:
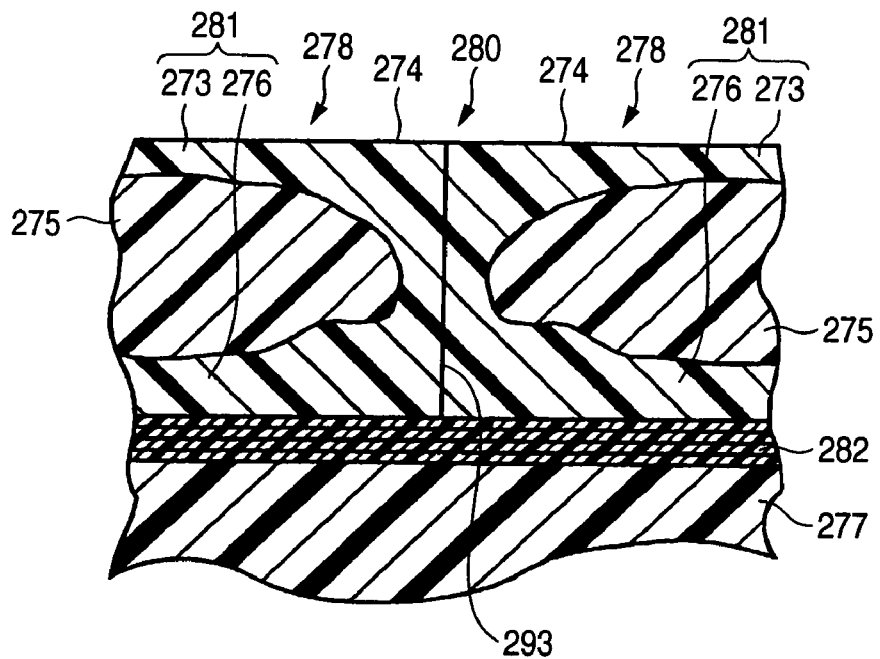
FIG. 19 is a partly-enlarged, schematic cross-sectional view of the high-pressure gas container of Embodiment 10 of the invention.
Figure 20:
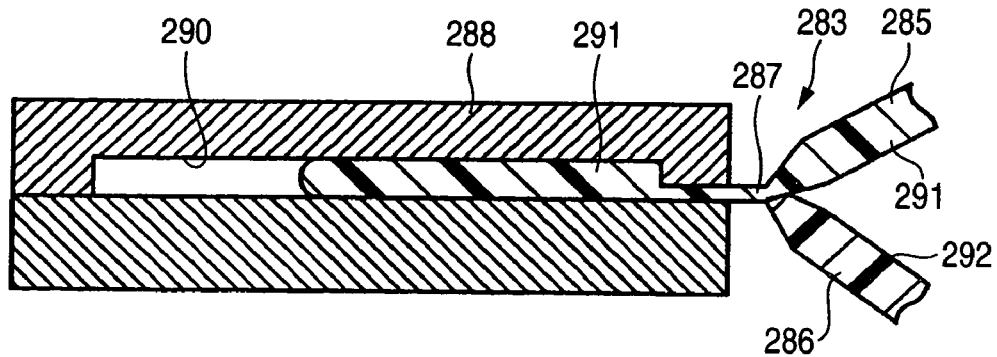
FIG. 20 is a schematic cross-sectional view showing the container body and the production units in a production step for it in Embodiment 10 of the invention.
Figure 21:
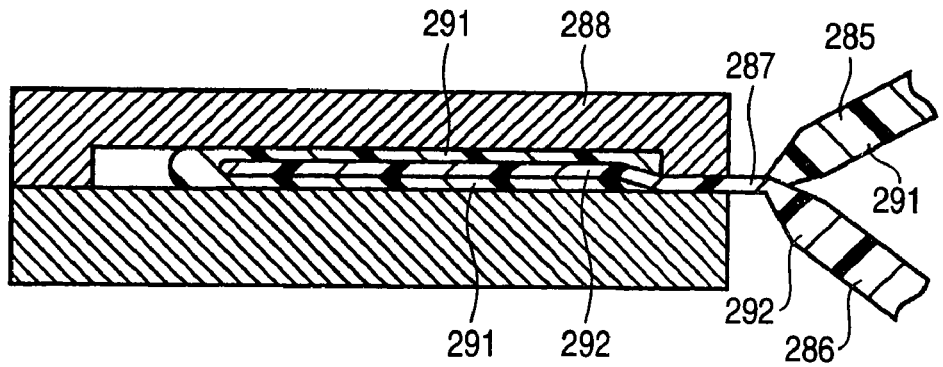
FIG. 21 is a schematic cross-sectional view showing the container body and the production units in a production step for it in Embodiment 10 of the invention.
Figure 22:
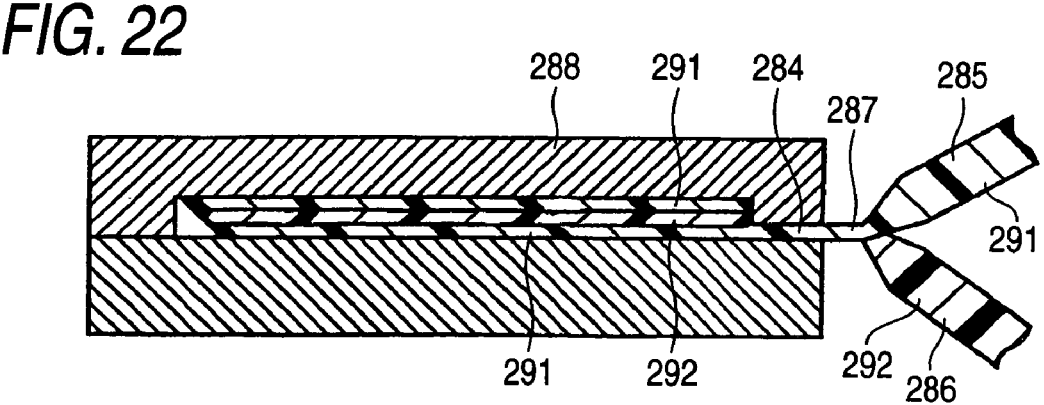
FIG. 22 is a schematic cross-sectional view showing the container body and the production units in a production step for it in Embodiment 10 of the invention.
Figure 23:
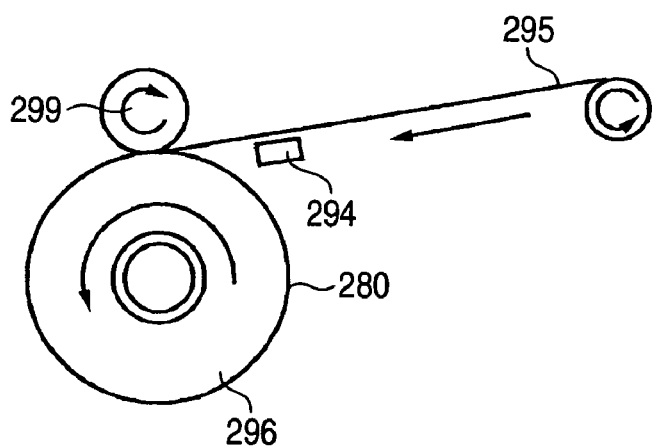
FIG. 23 is a schematic cross-sectional view showing the container body and the production units in a production step for it in Embodiment 10 of the invention.

Embodiment 10 is to demonstrate a container for high-pressure gas that is the same as the high-pressure gas container of Embodiment 7 except that the bonding part is formed of a cover resin layer alone and a second gas-barrier layer is laminated on the bonding part as the outer layer thereof. The split bodies of the high-pressure gas container of Embodiment 10 are formed in a mode of sandwich molding, FIG. 19 is a partly-enlarged, schematic cross-sectional view of the high-pressure gas container of Embodiment 10.

The container body of the high-pressure gas container of this Embodiment 10 has a three-layered structure that comprises an inner cover resin layer 273, a gas-barrier layer 275 and an outer cover resin layer 276, and a constraint layer 277 is further formed as the outer layer of the container body. Thus, the container has a four-layered structure. Of the layers, the three-layered part that comprises the inner cover resin layer 273, the gas-barrier layer 275 and the outer cover resin layer 276 forms the multi-layered structure 278. The bonding part 280 at which the split bodies 274 are bonded to each other is formed of the cover resin layer 281 alone. Of the container body, the bonding part 280 is laminated with a second gas-barrier layer 282 that is formed of the same material as the gas-barrier layer 275, as the outer layer of the part. The high-pressure gas container of Embodiment 10 exhibits a good gas-barrier property not only against high-molecular-weight gases but also even against low-molecular-weight gases owing to its gas-barrier layer 275, like those in Embodiments 7 to 9. In addition, since the cove resin layer 281 is formed as the inner layer and the outer layer of the gas-barrier layer 275, the container has good low-temperature impact resistance. Further, since a constraint layer 277 is formed as the outer layer of the container body and since a constraint member (not shown) is also formed, the container of this Embodiment is usable for filling and discharging high-pressure gas in and out of it, like the high-pressure gas containers of Embodiments 7 to 9. Moreover, since the bonding part 280 is formed of the cover resin layer 281 alone, bonding the split bodies may be firmly attained through welding, and the toughness of the thus-constructed, high-pressure gas container of this Embodiment is further improved. Furthermore, since the second gas-barrier layer 282 is formed as the outer layer of the cover resin layer 281 and it is formed of the same material as that of the gas-barrier layer 275, the second gas-barrier layer 282 acts to shield gas leakage even though gas may leak out of the container body through the cover resin layer 281 that forms the bonding part 280. Accordingly, the gas-barrier property of the high-pressure gas container of this Embodiment is good.

The method for producing the high-pressure gas container of Embodiment 10 comprises the same welding step, constraint member-forming step and constraint layer-forming step as in the method for producing the high-pressure gas container of Embodiment 7, and it further includes a gas barrier lamination step. The container body of Embodiment 10 and the device for producing it are illustrated as schematic cross-sectional views of FIG. 20 to FIG. 23 that separately show the production steps. The split body-forming step and the gas barrier lamination step in the method of producing the high-pressure gas container of Embodiment 10 are described below.

1-1. Split Body-Forming Step (Preparative Step):

The high-pressure gas container of Embodiment 10 is produced in a mode of sandwich molding. The sandwich molding device 283 comprises a first injection unit 285 for forming the cover resin layer 281 and the second injection unit 286 for forming the gas barrier layer 275. The first injection unit 285 and the second injection unit 286 have a head nozzle 287 common to the two. The head nozzle 287 communicates with the mold 288. The first injection unit 285 and the second injection unit 286 are controlled by a control unit (not shown). In this preparative step, an opening metal (not shown) is disposed on the mold face 290 of the mold 288, and polyethylene resin is put into the first injection unit 285 and heated and melted at 230° C. while the nozzle head 287 is closed. EVOH is put into the second injection unit 286, and heated and melted at 220° C.

1-2. Split Body-Forming Step (First Injection Step):

In this first injection step, the injection cylinder (not shown) of the first injection unit 285 is pulled back to the site that is spaced from the nozzle head 287 by 450 mm and the polyethylene resin melt 291 is thereby metered; and the injection cylinder (not shown) of the second injection unit 286 is pulled back to the site that is spaced from the nozzle head 287 by 200 mm and the EVOH melt 292 is thereby metered. Next, the first injection unit is made to communicate with the nozzle head 287 by the control unit (not shown) so that the polyethylene resin melt 291 is injected into the mold 288, as in FIG. 20. In this stage, the amount of the polyethylene resin melt 291 to be injected into the mold shall correspond to the amount for which the injection cylinder of the first injection unit 285 is moved forwardly by 400 mm. The other injection conditions are as follows: The injection speed is 100 mm/sec, the injection pressure is 170 kg/cm$^2$, and the injection time is 15 seconds. Through the first injection step, the polyethylene resin melt 91 is injected into the mold 288, as in FIG. 20.

1-3. Split Body-Forming Step (Second Injection Step):

In this second injection step, the injection cylinder of the first injection unit 285 is pressed toward the nozzle head 287 under 40 kg/cm$^2$ after the first injection step to thereby keep the pressure condition. Then, the second injection unit 286 is made to communicate with the nozzle head 287 by the control unit (not shown), and an EVOH melt 292 is injected into the mold 288 that has the polyethylene resin melt 291 previously injected there into, as in FIG. 21. In this stage, the amount of the EVOH melt 292 to be injected into the mold shall correspond to the amount for which the injection cylinder of the second injection unit 286 is moved forwardly by 190 mm. The other injection conditions are as follows: The injection speed is 100 mm/sec, the injection pressure is 170 kg/cm$^2$, and the injection time is 15 seconds. Through the second injection step, the EVOH melt 292 is injected into the polyethylene resin melt 291 that has been injected in the first injection step, as in FIG. 21.

1-4. Split Body-Forming Step (Third Injection Step):

In this third injection step, the first injection unit 285 is made to communicate with the nozzle head 287 by the control unit (not shown) after the second injection step to thereby further inject the polyethylene resin melt 291 into the mold 288 that has the polyethylene resin melt 291 and the EVOH melt 292 already injected thereinto. In this stage, the amount of the polyethylene resin melt 291 to be injected into the mold shall correspond to the amount for which the injection cylinder of the first injection unit 285 is moved forwardly by 35 mm. The other injection conditions are the same as in the first injection step. In this stage, the mold 288 is filled with the polyethylene melt 291 to form the inner cover layer 273, the polyethylene resin melt 291 to form the outer cover resin layer 276, and the EVOH melt 292 to form the gas-barrier layer 275, as in FIG. 22. The EVOH melt 292 is filled between the two layers of polyethylene resin melt 291 to form a layer having a nearly uniform and constant thickness therebetween.

1-5. Split Body-Forming Step (Cooling Step):

In this cooling step, the mold 288 is cooled to thereby solidify the inner cover layer 273, the outer cover layer 276 and the gas-barrier layer 275, and the gate 284 is cut to give a split part 274 of a container body. In the split body-forming step, the multi-layered structure 278 is formed that comprises the inner cover layer 273, the outer cover layer 276 and the gas-barrier layer 275. The end 293 of the split body 274 is formed of the cover resin layer 281 alone of polyethylene resin.

The split body-forming step is followed by the same welding step as in Embodiment 7 to complete a container body. In Embodiment 10, the welding step is followed by a gas barrier lamination step.

2. Gas Barrier Lamination Step:

In Embodiment 10, the second gas barrier layer 282 is formed of the same material, EVOH as that of the gas barrier layer 275. A tape 295 of EVOH is prepared, and it is wound up around the bonding part 280 of the container body 296 to form an outer layer thereon, as in FIG. 23. The outer layer thus formed around the bonding part 280 is the second gas barrier layer 282. In this stage, the tape 295 is wound up around the bonding part 280 while its face adjacent to the bonding part 280 is heated with a heating unit 294, and the thus-wound tape is pressed against the container body by the action of the roller 299 applied thereto thus, the tape 295 is partly heated, melted and welded together. The gas barrier lamination step is followed by a constraint member-forming step and a constraint layer-forming step, in which epoxy resin-infiltrated carbon fibers are wound up around the container body to cover it whereupon the tape 295 is further pressed against the container body and, while the epoxy resin is cured or the coated container body is heated, the tape 295 is further heated and melted and is thereby integrated with the container body and also with the constraint member and the constraint layer.

According to the method for producing the high-pressure gas container of Embodiment 10, the split part 274 of the container body 296 of which the end 293 is formed of the cover resin layer 281 alone is easy to construct, and, in addition, the second gas barrier layer 282 may be readily laminated on the bonding part 280 of the container body 96 that is constructed by welding and integrating the split bodies into one. Therefore, the method facilitates the production of the high-pressure gas container of the invention.

Embodiment 11

Figure 24:
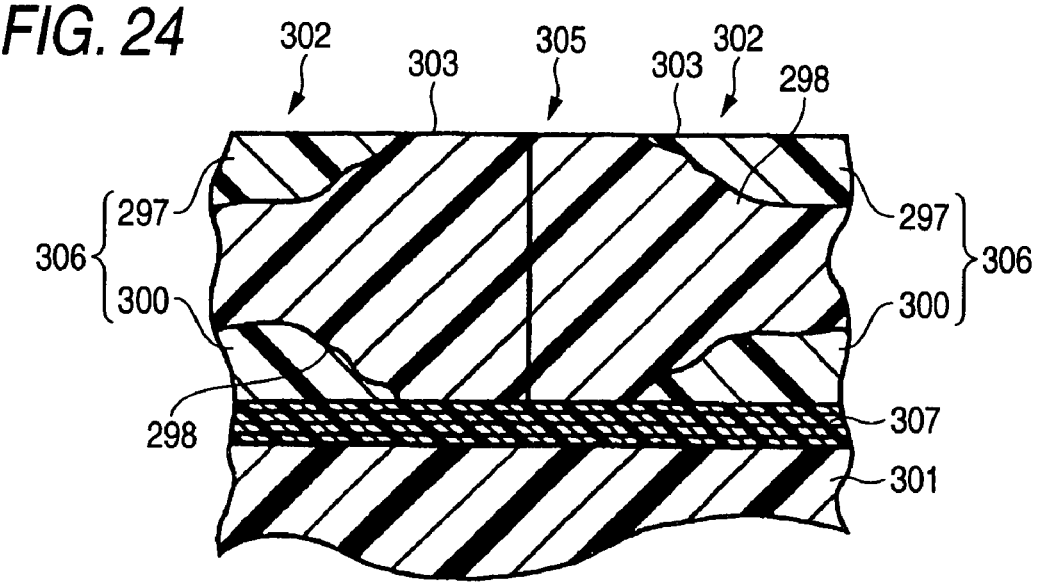
FIG. 24 is a partly-enlarged, schematic cross-sectional view of the high-pressure gas container of Embodiment 11 of the invention.

Embodiment 11 is to demonstrate a container for high-pressure gas that is the same as the high-pressure gas container of Embodiment 7 except that the bonding part is formed of a gas-barrier layer alone and a second cover resin layer is laminated on the bonding part as the outer layer thereof. The split bodies of the high-pressure gas container of Embodiment 11 are formed in a mode of sandwich molding, like in Embodiment 10. FIG. 24 is a partly-enlarged, schematic cross-sectional view of the high-pressure gas container of Embodiment 11.

The container body of the high-pressure gas container of this Embodiment 11 has a three-layered structure that comprises an inner cover resin layer 297, a gas-barrier layer 298 and an outer cover resin layer 300, and a constraint layer 301 is further formed as the outer layer of the container body. Thus, the container has a four-layered structure. Of the layers, the three-layered part that comprises the inner cover resin layer 297, the gas-barrier layer 298 and the outer cover resin layer 300 forms the multi-layered structure 302. The bonding part 305 at which the split bodies 303 are bonded to each other is formed of the gas-barrier layer 298 alone. Of the container body, the bonding part 305 is laminated with a second cover resin layer 307 that is formed of the same material as the cover resin layer 306, as the outer layer of the part. The high-pressure gas container of Embodiment 11 exhibits a good gas-barrier property not only against high-molecular-weight gases but also even against low-molecular-weight gases owing to its gas-barrier layer 298, like those in Embodiments 7 to 10. In addition, since the cove resin layer 306 is formed as the inner layer and the outer layer of the gas-barrier layer 298, the container has good low-temperature impact resistance. Further, since a constraint layer 301 is formed as the outer layer of the container body and since a constraint member (not shown) is also formed, the container of this Embodiment is usable for filling and discharging high-pressure gas in and out of it, like the high-pressure gas containers of Embodiments 7 to 10. Moreover, since the bonding part 305 is formed of the gas-barrier layer 298 alone, bonding the split bodies may be firmly attained through welding, and the toughness of the thus-constructed, high-pressure gas container of this Embodiment is further improved. Furthermore, since the second cover resin layer 307 is formed as the outer layer of the gas-barrier layer 298 and it is formed of the same material as that of the cover resin layer 306, the low-temperature impact resistance of the container at its bonding part 305 is good.

The high-pressure gas container of Embodiment 11 may be produced according to the same process as in Embodiment 10. Briefly, the amount of the resin melt to be injected from the first injection unit and that from the second injection unit are suitably determined, and a split body 303 of which the end is formed of the gas barrier layer 298 alone is constructed. In the cover resin lamination step, a tape of polyethylene resin is wound up around the bonding part 305 of the container body in the same manner as in the gas barrier lamination step in Embodiment 10, and a second cover resin layer 307 is thus laminated on the bonding part 105 as the outer layer thereof.

According to the method for producing the high-pressure gas container of Embodiment 11, the split part 303 of the container body of which the end 308 is formed of the gas-barrier layer 298 alone is easy to construct, and, in addition, the second cover resin layer 307 may be readily laminated on the bonding part 305 of the container body that is constructed by welding and integrating the split bodies 303 into one. Therefore, the method facilitates the production of the high-pressure gas container of the invention.

As described hereinabove, since the container body of the high-pressure gas container of the invention is formed of a resin material, the container is lightweight and has a lot of latitude in its shape. In addition, since the gas barrier layer in the container is formed of EVOH, the container exhibits a satisfactory and good gas-barrier property not only against high-molecular-weight gases such as CNG but also even against low-molecular-weight gases such as hydrogen gas. Further, since a cover resin layer is formed as the inner layer and/or the outer layer of the gas barrier layer in the container, the container body ensures good low-temperature impact resistance. Moreover, when a constraint member is formed in the outer layer of the container body, in addition to the constraint layer formed around the container body, the expansion of the container body is restricted more and the pressure resistance of the high-pressure gas container is increased more, and, as a result, the container may be used for filling and discharging gases of higher pressure than usual in and out of it. Further, when the container body is constructed by bonding plural split parts into one, the bonding part thereof maybe formed of a gas-barrier layer or a cover resin layer alone, and the toughness of the high-pressure gas container of that type is further increased. When the bonding part of the container body is formed of a cover resin layer alone, a second gas-barrier layer may be additionally laminated thereon as the outer layer thereof and the gas-barrier property of the high-pressure gas container may be thereby further increased. When the bonding part of the container body is formed of a gas-barrier layer alone, a second cover resin layer may be additionally laminated thereon as the outer layer thereof and the low-temperature impact resistance of the high-pressure gas container may be thereby further increased. According to the production method of the invention, the high-pressure gas container of the invention can be readily produced.

What is claimed is:

1. A pressure container comprising:
    a hollow container body whose inner surface is coated with a resinous liner and which has an opening at one end thereof; and
    an opening metal attached at a circumferential edge of the opening so as to protrude from the container body, the opening metal having a flange that extends in a radial direction of the container body, wherein
    the liner has a self-sealing part abutting with the flange for sealing and a ring groove, which opens radially outward;
    a ring-shaped constraint member is provided around the self-sealing part and is accommodated within the ring groove so as to restrict an expansion of the liner to be caused by an expansion of the container body;
    the constraint member is formed of a fiber reinforced plastic filament winding; and
    the constraint member is located on an outer side of the self-sealing part in the radial direction such that the flange is not located between the constraint member and the self-sealing part.

2. The pressure container as claimed in claim 1, wherein an easily-displaceable part that is elongatable and deformable more easily than the remaining portion thereof is formed on an outer peripheral side of the self-sealing part in the radial direction.

3. The pressure container as claimed in claim 1, wherein the liner is formed of a laminate structure including a gas barrier-layer of EVOH and a cover resin layer.

4. A pressure container as claimed in claim 1,
    wherein the liner has a multi-layered structure that includes a gas-barrier layer formed of EVOH for shielding a penetration of a gas filled in the container body, and
    a cover resin layer formed as at least one of an inner layer and an outer layer of the gas-barrier layer for ensuring a low-temperature impact resistance of the container body.

5. The pressure container as claimed in claim 4, wherein the liner is constituted by bonding plural split bodies that are separately formed, and a bonding part between the split bodies are formed of only one of the gas barrier layer and the cover resin layer.

6. The pressure container as claimed in claim 5, wherein the bonding part of the liner is formed of only the cover resin layer, and a second gas-barrier layer is laminated at least on the bonding part as an outer layer of the bonding part, and the constraint layer is formed as the outer layer of the container body and the second gas-barrier layer.

7. The pressure container as claimed in claim 5, wherein the bonding part of the liner is formed of only the gas-barrier layer, and a second cover resin layer is laminated at least on the bonding part as the outer layer of the part, and the constraint layer is formed as the outer layer of the container body and the second cover resin layer.

8. A pressure container comprising:
    a hollow container body, the inner surface of which is coated with a resinous liner, wherein an opening is located at one end of the hollow container body; and
    an opening metal attached at a circumferential edge of the opening to protrude from the container body, the opening metal having a flange that extends in a radial direction of the container body, wherein
    the liner has a self-sealing part abutting against the flange for sealing and a ring groove, which opens radially outward;
    a ring-shaped constraint member is provided around the self-sealing part and is accommodated within the ring groove to restrict expansion of the liner caused by expansion of the container body;
    the constraint member is a filament winding of fiber reinforced plastic; and
    the constraint member applies force in a radially inward direction to an outer surface of the self-sealing part to restrict expansion of the liner, and
    the constraint member is located radially outward of the flange.

* * * * *